United States Patent
Soucy

(10) Patent No.: US 11,607,779 B2
(45) Date of Patent: Mar. 21, 2023

(54) SHAFT SPRING CLUTCH APPARATUS

(71) Applicant: Daniel Soucy, Reno, NV (US)

(72) Inventor: Daniel Soucy, Reno, NV (US)

( * ) Notice: Subject to any disclaimer, the term of this patent is extended or adjusted under 35 U.S.C. 154(b) by 457 days.

(21) Appl. No.: 16/874,383

(22) Filed: May 14, 2020

(65) Prior Publication Data
US 2021/0354271 A1  Nov. 18, 2021

(51) Int. Cl.
| *B25B 15/02* | (2006.01) |
| *F16D 11/14* | (2006.01) |
| *B25B 23/00* | (2006.01) |
| *F16D 11/00* | (2006.01) |

(52) U.S. Cl.
CPC .......... *B25B 15/02* (2013.01); *B25B 23/0035* (2013.01); *F16D 11/14* (2013.01); *F16D 2011/006* (2013.01)

(58) Field of Classification Search
CPC ... B25B 23/141; B25B 23/1427; B25B 15/02; B25B 15/004; F16D 11/14; F16D 2011/006
See application file for complete search history.

(56) References Cited

U.S. PATENT DOCUMENTS

| 2,236,101 | A | * | 3/1941 | Kirkland | ............... B25B 23/141 |
| | | | | | 192/56.62 |
| 2,430,044 | A | * | 11/1947 | Campsmith | ......... B25B 23/1427 |
| | | | | | 81/451 |
| 2,725,770 | A | | 12/1955 | Short et al. | |
| 2,772,589 | A | * | 12/1956 | Brenholts | ............... F16D 7/028 |
| | | | | | 81/476 |
| 3,012,456 | A | * | 12/1961 | Dracka | .................. B25B 23/141 |
| | | | | | 81/475 |
| 4,159,050 | A | | 6/1979 | Hopkins, Sr. et al. | |
| 4,775,040 | A | | 10/1988 | Telford | |
| 4,809,572 | A | | 3/1989 | Sasaki | |
| 5,060,733 | A | | 10/1991 | Kress | |
| 5,538,089 | A | | 7/1996 | Sanford | |

(Continued)

FOREIGN PATENT DOCUMENTS

JP          2001138259 A * 5/2001 ............. B25B 15/02

*Primary Examiner* — David B. Thomas
(74) *Attorney, Agent, or Firm* — The Law Forge; Francis D. Ward

(57) ABSTRACT

The Shaft Spring Cutch is an apparatus, used to drive fasteners, or the like, that is multi-directional, and non-ratcheting, comprised of two drive members, separated and held in an unengaged position by a return spring, that are axially retained within a guide housing. The first drive member is attached to a handle or input shaft. The second drive member is attached to a drive bit. When in an unengaged position, the handle, or input shaft, can rotate freely in either direction relative to the drive bit. The first and second drive members are engaged by applying axial force sufficient to overcome the return spring force, which locks the handle, or input shaft, and drive bit together. Once engaged, any rotational force applied to the handle, or input shaft, is transferred to the drive bit. Optionally, the apparatus may be locked together for continuous drive bit engagement using a locking mechanism and a fastener can be placed directly on the drive bit, then using a feature of the tool, the fastener can be spun by hand until set.

19 Claims, 22 Drawing Sheets

(56) References Cited

U.S. PATENT DOCUMENTS

| | | | | |
|---|---|---|---|---|
| 5,655,421 | A * | 8/1997 | Haupt | B25B 23/1427 |
| | | | | 81/476 |
| 5,950,509 | A * | 9/1999 | Doong | B25B 21/00 |
| | | | | 81/475 |
| 6,244,358 | B1 | 6/2001 | Beer et al. | |
| 6,526,852 | B2 | 3/2003 | Rahmsdorf et al. | |
| 6,739,225 | B2 | 5/2004 | Bader et al. | |
| 6,832,533 | B1 * | 12/2004 | Huang | B25B 23/1427 |
| | | | | 81/475 |
| 7,431,136 | B2 | 10/2008 | Simm et al. | |
| 8,808,095 | B2 * | 8/2014 | Cheng | F16D 7/044 |
| | | | | 464/23 |
| 9,266,178 | B2 | 2/2016 | Eshleman et al. | |
| 11,173,586 | B2 * | 11/2021 | Sebree | B25B 21/007 |
| 2009/0194307 | A1 * | 8/2009 | Rinner | B25B 23/1427 |
| | | | | 81/145 |
| 2015/0306760 | A1 * | 10/2015 | Meng | B25H 3/003 |
| | | | | 206/377 |
| 2018/0222021 | A1 * | 8/2018 | Plehn-Citrone | B25B 15/04 |

* cited by examiner

SHAFT SPRING CLUTCH APPARATUS

FIELD OF THE INVENTION

The field of hand and power tools, fastener driving, valve turning, and the like.

CROSS REFERENCE TO RELATED APPLICATIONS

This application does not claim priority from another application.

REFERENCE REGARDING FEDERALLY SPONSORED RESEARCH OR DEVELOPMENT

Not Applicable to this invention.

BACKGROUND

Currently, in the hand tool, power tool, valve turning, and fastener driving industries there exists a strong need for a simple, effective, and easy to use fastener driver.

Fasteners have been used in many industries for hundreds of years to join materials, make anchor points, and for use in many other applications. The earliest fasteners were simple screws made using hand filing, and later during the 1760's using lathes and cutting dies. Fasteners now come in many varieties including wood screws, machine screws, Hex cap screws, lag screws, and bolts among others. Typically, the head of a fastener is a piece of material larger than the body of the fastener and incorporates features that are used to allow the fastener to be rotated around its central axis ("driven") and provide a support surface for the material the fastener is inserted into to push against as the fastener is tightened. At the opposite end of the fastener from the head is some type of threading which allows the fastener to be anchored. In screws, the threading is tapered toward the outer circumference, allowing the screw to dig in and wedge into a material when turned, while the thread cuts grooves in the fastened material that may help pull fastened materials together and prevent pull-out. In contrast, bolts are typically inserted in a material in which a female thread has been cut.

Fasteners can be driven or tightened in many ways using many tools. Some fasteners, such as Hex cap screws or Hex head bolts, use an external feature on the head of the fastener to allow a tool, such as a spanner or wrench, to grip the fastener. Others, such as wood screws and Socket Head Cap Screws, use an internal feature in the head of the fastener to allow a tool like a screwdriver or hex key to be inserted into the head and drive the fastener. Fasteners may be driven by hand or mechanically depending upon the application.

Over the years, many types of internal features in the head of the fastener ("screw drives") have been invented and used. The first commonly used drive was the slot head, which uses a single cut through the center of the head of the fastener and a flat bladed driver that matches the slot in the head of the fastener. However, this design allows the driver to easily slip out of the screw drive when turning the fastener. Later designs, such as the Phillips head, use a cruciform screw drive that prevents the driver from slipping out of the screw drive when turning until a set amount of torque is reached. Other designs use more complex internal shapes, such as hexes, squares, triangles, hexalobular, or other polygonal shapes. However, regardless of the drive shape, fasteners must still be driven using a driver that is part of a hand or power tool.

Typical hand tools used to drive internal drive fasteners include screwdrivers, hex wrenches, or a multi-part tool that includes a driver bit and a driver handle of some type.

Screwdrivers are among the earliest types with a history stretching back hundreds of years. However, screwdrivers suffer from being limited to one type of screw drive and must be sized for the type of application for which it will be used. For example, most common screwdrivers found in hardware stores for home use, use a standard slot head or Philips head drive and are sized for low torque applications with a small handle. Thus, though they are adequate for small fasteners and home use, they cannot torque larger fasteners. In addition, screwdrivers have a fixed driver, so each revolution of the screwdriver equates to one revolution of the fastener. Because the human hand cannot rotate 360 degrees, the screwdriver must be removed from the fastener and returned to its starting position during use to allow the fastener to be rotated by hand. This makes screwdrivers unergonomic and are uncomfortable to use for long periods of time.

To overcome these limitations, a variety of solutions have been tried with limited success. For example, many screwdrivers are available which use interchangeable bits, making them useable for a variety of fastener types. However, these designs still use a fixed handle size, which limits their utility.

Other screwdrivers use manually setting rachets to avoid the need to remove the need to remove the driver bit from the fastener each turn. However, these designs still require the user to apply pressure to the screwdriver throughout the turning process, which makes them uncomfortable to use for long periods. This also makes them susceptible to popping out of the fastener, if the pressure is reduced at any time while turning the screwdriver handle.

In addition, a variety of non-standard screwdriver handle designs have been tried, such as T-handles. While these designs allow for more torque be applied to the fastener, they do not overcome the other limitations described previously. Furthermore, some screw drives, such as Phillips head, do not work well with these types of handles because the increased torque applied by the handle causes the driver to come out of the screw drive.

Other types of drivers, like hex key wrenches have been tried. The hex key wrench is usually formed of a single piece of hexagonal rod of hard steel, with blunt ends that are meant to fit snugly into the screw drive on the fastener, and are bent in an "L" shape with unequal arms. The tool is usually held and rotated by the long arm, creating a large torque at the tip of the short arm. Reversing the tool lets the long arm reach screws in hard-to-reach places.

This design allows for more torque to be applied to the fastener because the screw drive is more robust, and the hex shape and snug fit of the screw drive typically keeps the tool inserted in the fastener. However, this means the tool must be removed from the fastener during the driving process if there is not enough clearance around fastener for the tool to rotate freely. This problem is exacerbated by the hex shape of the screw drive, because it only allows the tool to be inserted in 60-degree increments. In practice this means the fastener may be turned to a position where it cannot be effectively reached by the hex wrench because the wrench cannot be positioned in a way that allows the wrench to be rotated in the desired direction.

In addition, the hex key drive only allows the tool to be inserted perpendicular to the head of the fastener, unless the hex key incorporates a "ball end." The "ball end" is created by rounding off the corners of the end of the hex key, cutting a groove a set distance above the hex key end, and rounding the edge of the groove. Thus, when finished the end of the hex key has a roughly ball shape at the end connected to the main shaft by a narrower shaft. This feature cut in the end of the wrench allows it to be inserted at an angle to the head of the fastener, but at the cost of reducing the contact area between the fastener and wrench and weakening the strength of the hex key. Thus, ball end wrenches are far more susceptible to damaging the hex drive on the fastener, and due to the cuts in the wrench shaft, are more likely to break during use.

In addition to manual tools, a variety of power tools have been tried to drive fasteners using many of the above described screw drives. For example, many handheld power drills and impact drivers include a screw drive bit insert when purchased. However, while greatly improving the speed at which fasteners can be driven, these power tools commonly apply force to the fastener so quickly that the fastener is ejected from the workpiece. For example, when starting a screw into a piece of wood, or other material, unless the power tool is pushed hard against the screw the screw will be ejected from the drive bit as soon as the power tool is engaged.

As another example, power tools cannot be used to start fasteners, such as bolts, in female threaded holes because of the risk cross threading, or otherwise damaging, the threads. The below described new apparatus was developed to overcome the limitations inherent in the above described tools.

SUMMARY OF THE INVENTION

The present driver clutch apparatus, called the Shaft Spring Clutch, allows for an easier and more comfortable user experience, along with a stronger tool, by being multi-directional, non-ratcheting, and operable using a handle, a power tool, or by hand.

The Shaft Spring Clutch overcomes the above described problems by incorporating a selectively engaged clutch with a handle and driver set. Optionally, the clutch may be locked in an engaged position using a locking mechanism, and the outside of the clutch, or its mechanisms, may be knurled allowing a user to grip and rotate the drive bit without rotating the handle.

Thus, the fastener may be turned without removing the driver bit from the fastener either using the handle or by rotating the clutch without moving the handle. Similarly, when attached to a power tool, the fastener may be turned using the power tool or by rotating the clutch without moving the handle. In addition, the handle and driver bits allow the Shaft Spring Clutch to be used in almost every application.

Importantly, the Shaft Spring Clutch also allows a user to "finger tighten" a fastener by placing the fastener on the end of the tool, starting the fastener, and using the knurled portion of the clutch, or its mechanisms, to drive the fastener by hand without needing to rotate the handle or use a power tool. This allows a user to conveniently start a fastener without the risk of moving the fastener out of position by applying torque or pressure from the handle.

In its most basic form, the Shaft Spring Clutch uses a first drive member and a second drive member, held in an unengaged position by a return spring, that are housed inside a bore, or other passageway, of a guide housing. The first drive member is selectively attached to an input shaft with a handle, and the second drive member is selectively attached to a drive bit. The first and second drive members are axially contained within the guide housing by a retainer.

During operation by a user, the return spring holds the first and second drive members in an unengaged position, which allows the handle to rotate freely relative to the drive bit. Then, when the user inserts the drive bit into a fastener and applies axial force to the handle in the direction of the drive bit that is sufficient to overcome the spring force of the return spring, the first and second drive members engage, thereby locking the handle and drive bit together. Once locked together, any rotational force applied to the handle is transferred to the drive bit.

When used with a power tool, the input shaft ends in a shank capable of mating with common power tools such as hand drills or power drivers. Again, the first and second drive members are engaged by applying axial force sufficient to overcome the return spring and once engaged the input shaft is locked together with the drive bit. Thus, any rotational motion or force applied by the power tool is transmitted to the drive bit.

The first and second drive members may engage using a variety of features. As examples of several possible embodiments, the drive members may engage using teeth, splines, friction pads, or magnets.

In other possible embodiments, one of the drive members, either the upper or lower, may be fixed to the guide housing, so that the guide housing rotates with that drive member. The lower drive member may be fixed in place using a press fit, welds, fasteners, pins, keys, or any other method commonly used to fix a shaft inside a bore. Preferably, the lower drive member is used so that a user may grip and rotate the guide housing to rotate the drive bit. The two parts can be fixed together using a press fit, material deformation, threading, pins, fasteners, or adhesives.

This feature is useful for positioning the bit relative to the fastener or for driving the fastener without the need to turn the handle. Optionally, the exterior surface of the guide housing may be knurled, or given other texturing, have a shape operable to allow gripping by a wrench or other tool, or have handles attached to aid in turning the guide housing.

In this and other embodiments, the retainers used to axially locate the drive members in the guide housing may be snap rings, pins, a threaded insert, threaded guide housing and drive members, internal features in the guide housing such as shoulders or a decreased diameter, bearings, welds, material deformation, or fasteners.

The handle may come in a variety of shapes and features, for example it may be "L" or "T" shaped. The handle may also be similar to a traditional screwdriver handle.

In other possible embodiments, the return spring may come in a variety of forms including a coil spring, volute spring, or leaf spring. The Shaft Spring Clutch may also use multiple return springs.

In another possible embodiment, the Shaft Spring Clutch consists of an input shaft connected to a first gear, which is housed inside a bore of a guide housing. A second gear is also located inside the guide housing, opposite the first gear, with a return spring keeping the two gears in a disengaged position. A bearing inside the guide housing allows the second gear to rotate freely and the first gear may include ball bearing or a bearing to allow it to rotate freely. However, these bearings are removed in other embodiments. When disengaged, the first gear and input shaft may rotate freely relative to the guide housing and second gear. When axial force is applied to the shaft, it moves toward the second gear and engages the second gear. Once engaged, rotational motion applied to the shaft is translated across the gears and thereby rotates a tool bit attached to the second gear.

In some possible embodiments, a locker and locker retainer are included which force the first and second gears to engage and thereby manually locks the clutch into an engaged position. The locker is designed to allow it to move freely, axially, along the input shaft to a threaded portion of the input shaft onto which it can thread. The locker may be manufactured in several pieces and assembled on the shaft using fasteners, welds, or adhesives. The locker retainer is pressed into the guide housing so that it is axially fixed and has a bore which allows the input shaft to freely pass through it. It also acts as the axial retainer for the first gear. When the locker is threaded onto the threaded section of the input shaft and tightened, the locker becomes axially constrained by the locker retainer. Once the locker becomes axially constrained, the input shaft is forced toward the second gear thereby engaging the first and second gears.

In in these and other possible embodiments, the first or second gears may include a spring guide shaft that is able to fit through the inner diameter of a helical spring that acts as the return spring. In addition, a plunger is attached to the end of the spring guide shaft, which acts to keep the spring attached to the spring guide shaft. The plunger fits inside a shaft through the first and second gears, with the shaft acting to guide the plunger as it moves axially. Together the plunger and spring guide shaft keep the return spring contained and properly oriented. The plunger may be attached to the spring guide shaft using threading, material deformation, adhesive, or fasteners.

While the end of the input shaft opposite the end connected to the upper gear is permanently connected to the handle or made as part of the handle, alternatively in these and other possible embodiments, the end of the input shaft opposite the end connected to the upper gear may include a feature allowing it to interchangeably connect with various types of handles. For example, the handle may be "L" or "T" shaped. The handle may also be similar to a traditional screwdriver handle. The interchangeable handle feature may be a threaded connection, a socket connection, a quick connect, fastener, or other common connection.

In these and other possible embodiments, the first and second gears may engage using a variety of teeth shapes, numbers, and designs. Preferably, the tooth shape consists of a flat section close to the base of the tooth extending a set distance for the base. At the opposite end, the tooth shape is either rounded or beveled such that unless fully engaged, the shape of the teeth will allow the gears to rotate slightly until fully engaged or disengaged.

Also, in these and other embodiments, the tool bit end of the second gear may extend past the end of the guide housing and be used as a grip point to manually rotate the tool bit without rotating the input shaft or upper gear while also acting as the axial retainer for the second gear. This section of the lower gear may also be knurled, or given other texturing, have a shape operable to allow gripping by a wrench or other tool, or handles attached to aid in turning the lower gear. Preferably, this section is hexagonal is cross section so that a wrench may be used to turn the lower gear.

In another possible embodiment, the Shaft Spring Clutch consists of an input shaft connected to a spline shaft which is housed inside a bore of a guide housing. The guide housing has internal splines that engage the splines of a drive member, thereby locking the drive member and guide housing together. A return spring keeps the spline shaft in a disengaged position. When disengaged, the spline shaft and input shaft may rotate freely relative to the guide housing and drive member. When axial force is applied to the input shaft, it moves the spline shaft toward the drive member and engages the spline shaft splines with the guide housing splines. Once engaged, rotational motion applied to the input shaft is translated across the assembly and thereby rotates the tool bit.

In some possible embodiments, a locker and locker retainer are included which, force the spline shaft and drive member to engage and thereby manually locks the clutch into an engaged position. The locker is designed to allow it to move freely, axially, along the input shaft to a threaded portion of the input shaft onto which it can thread. The locker may be manufactured in several pieces and assembled on the shaft using fasteners. The locker retainer is pressed into the guide housing so that it is axially fixed and has a bore which allows the input shaft to freely pass through it. It also acts as the axial retainer for the spline shaft. When the locker is threaded onto the threaded section of the input shaft and tightened, the locker becomes axially constrained by the locker retainer. Once the locker becomes axially constrained, the input shaft is forced toward the drive member thereby engaging the first and second gears.

In in these and other possible embodiments, the drive member may include a spring guide shaft that is able to fit through the inner diameter of a helical spring that acts as the return spring. In addition, a plunger is attached to the end of the spring guide shaft, which acts to keep the spring attached to the spring guide shaft. The plunger fits inside a shaft through the spline shaft, with the shaft acting to guide the plunger as it moves axially. Together the plunger and spring guide shaft keep the return spring contained and properly oriented. The plunger may be attached to the spring guide shaft using threading, material deformation, adhesive, or fasteners.

While the end of the input shaft opposite the end connected to the upper gear is permanently connected to the handle or made as part of the handle, alternatively in these and other possible embodiments, the end of the input shaft opposite the end connected to the upper gear may include a feature allowing it to interchangeably connect with various types of handles. For example, the handle may be "L" or "T" shaped. The handle may also be similar to a traditional screwdriver handle. The interchangeable handle feature may be a threaded connection, a socket connection, a quick connect, or other common connection.

In these and other possible embodiments, the spline shaft, guide housing, and drive member may engage using a variety of spline shapes, spline numbers, and designs. Preferably, the splines are of a commonly used design with enough clearance such that the splines easily engage and disengage when axial force is applied.

Also, in these and other embodiments, the tool bit end of the drive member may extend past the same end of the guide housing and be used as a grip point to manually rotate the tool bit without rotating the input shaft or upper gear while also acting as the axial retainer for the drive member. This section of the lower gear may also be knurled, or given other texturing, have a shape operable to allow gripping by a wrench or other tool, or handles attached to aid in turning the lower gear. Preferably, this section is hexagonal is cross section so that a wrench may be used to turn the lower gear.

In these and other embodiments, the spline shaft, first drive member, or first gear may include integral ball bearings surrounding the part to stabilize them within the guide housing.

In addition to the above embodiments, or as an enhancement to the above embodiments, the input shaft may attach to the output end of a power tool such as an impact driver or power drill. In one embodiment, the input shaft is machined into the commonly used hex shank shape, for easier fitment into the jaws of a power drill or the receiver of an impact driver. Alternatively, the shank can be machined cylindrically for use with jaw chucks, as commonly found on power drills. These variants will allow the apparatus to be used with most common power tools including power drills, impact drivers, power screwdrivers, and the like. As can be readily ascertained the input shaft end can be machined to almost any shape that is operable for use with power tools.

Once attached to a power tool, the apparatus can be used to manually start the fastener, either in a work piece or mating thread, thereby overcoming the biggest limitation of using a power tool to drive the fastener. Namely having to start the fastener with the power of the power tool which often causes the fastener to move out of position.

In addition to the above, the Shaft Spring Clutch second drive member may be designed so that instead of being attached to a drive bit, it can be attached to other types of drivers such as sockets, water meter valve keys, or sprinkler valve keys. Attachment to a socket allows the apparatus to drive fasteners with hex heads or other external drive features.

Alternatively, attachment of the second drive member to a sprinkler valve key allows the apparatus to be used to open and close sprinkler valves, which are often located in hard to reach locations. In addition, the selective engagement of the apparatus allows the user to turn then reset the handle of the tool without needing to remove the valve key from the sprinkler valve.

Another possible embodiment comprises a first drive member with a first end and a second end; a second drive member with a first end and a second end, wherein the first drive member first end is configured to engage the second drive member first end; an input shaft with a first end and a second end, wherein the input shaft first end is connected to the first drive member second end; at least one return spring, wherein the return spring is located between the first drive member and the second drive member; a tool bit with a first end and a second end, wherein the tool bit first end is connected to the second drive member second end, and the tool bit second end is operable to drive fasteners; a guide housing with a first end, a second end, and an inner passageway, wherein the first drive member and the second drive member are located inside the inner passageway; and a retaining means for constraining axial movement of the first drive member and the second drive member within the inner passageway of the guide housing.

In another possible embodiment, the first drive member and the second drive member are configured to engage using at least one of a group consisting of teeth, splines, friction pads, or magnets.

In another possible embodiment, the retaining means comprises at least one of a group consisting of snap rings, pins, a threaded insert, an internal feature of the inner passageway, welds, or fasteners.

In these and other possible embodiments, the tool bit second end is operable to drive fasteners using at least one of a group of screw drives consisting of a slot drive, cross drive, Phillips Head drive, Frearson drive, French Recess drive, JIS B 1012 drive, Mortoq drive, Pozidriv drive, Supadriv drive, Torq-set drive, Phillips/Slotted drive, Square drive, Pent drive, Hex drive, 12-point drive, Tri-angle drive, Robertson drive, Hex socket drive, Security hex drive, Double-square drive, Triple-square drive, 12-spline flange drive, Double hex drive, Torx drive, security Torx drive, Torx Plus drive, Polydrive drive, Torx ttap drive, External Torx drive, Line Head male drive, Line Head female drive, Line Head Female tamper drive, Tri-point drive, Tri-groove drive, Tri-wing drive, Clutch A drive, Clutch G drive, One-way drive, Bristol drive, Quadrex drive, Pentalobe drive, or Spanner head drive.

In another possible embodiment, the tool bit second end is operable to open or close valves using at least one of a group consisting of a sprinkler fork valve key or water meter valve key.

In these and other possible embodiments, the tool bit first end is either fixedly connected or removably connected to the second drive member second end.

In another possible embodiment, the apparatus further comprises an attachment mechanism for attaching the input shaft second end to a power tool chuck or attachment point, wherein the attachment mechanism is a hex shank connector.

In another possible embodiment, the apparatus further comprises a handle, wherein the handle is connected to the input shaft second end.

In another possible embodiment, the handle comprises at least one of a group consisting of a hexagonal cross-section handle, a square cross-section handle, an oval cross-section handle, a polygonal cross-section handle, an "L" shaped handle, or a "T" shaped handle.

In another possible embodiment, the handle is removably connected to the input shaft second end using at least one of a group consisting of a threaded connection, a socket connection, a fastener, adhesive, material deformation or a quick connector.

In another possible embodiment, the apparatus further comprises a locker; a locker retainer, wherein the locker is fixedly connected to the first end of the guide housing; a threaded section on the input shaft; wherein the threaded section on the input shaft is operable to thread into a threaded inner bore in the locker; and a connection means for moveably connecting the locker to the locker retainer.

In another possible embodiment, the connection means comprises at least one of a group consisting of overlapping extrusions, pins and slots, or elastic connectors.

In another possible embodiment, the apparatus further comprises a spring guide shaft with a first end and a second end, wherein the spring guide shaft is connected to the second drive gear at the second end and is operable to pass freely through the at least one return spring; a plunger, wherein the plunger is attached to the spring guide shaft first end; an inner bore in the input shaft, wherein the input shaft inner bore is large enough to accommodate the plunger; a large inner bore in the first drive member, wherein the first drive member large inner bore is large enough to accommodate the plunger; a small inner bore in the first drive member, wherein the first drive member small inner bore is large enough to allow the spring guide shaft to fit freely through; and wherein the plunger is contained within a bore defined by the input shaft inner bore and the first drive member large inner bore, and the spring guide shaft passes through the at least one return spring and the first drive member.

In another possible embodiment, an outer surface of the guide housing is textured operable to allow the material extrusion to be gripped.

In another possible embodiment, an outer surface of the guide housing is polygonal in cross-section so that it is operable to have a wrench grip the material extrusion.

In another possible embodiment, the apparatus further comprises a material extrusion extruding from the second drive member second end, wherein the material extrusion extrudes past an outer surface of the guide housing in an axial direction and wherein the material extrusion extrudes to or past the outer surface of the guide housing in a direction tangent to the axial direction.

In another possible embodiment the material extrusion is textured operable to allow the material extrusion to be gripped.

In another possible embodiment, the material extrusion texture comprises at least one of a group consisting of knurling, peening, or a textured coating.

In another possible embodiment, the material extrusion is polygonal in cross-section so that it is operable to have a wrench grip the material extrusion.

Another possible embodiment comprises a first drive member with a first end and a second end; a second drive member with a first end and a second end, wherein the first drive member first end is configured to engage the second drive member first end and wherein said second drive member second end is operable to connect with a drive socket mating connection; an input shaft with a first end and a second end, wherein the input shaft first end is connected to the first drive member second end; at least one return spring, wherein the return spring is located between the first drive member and the second drive member; a guide housing with a first end, a second end, and an inner passageway, wherein the first drive member and the second drive member are located inside the inner passageway; and a retaining means for constraining axial movement of the first drive member and the second drive member within the inner passageway of the guide housing.

In other possible embodiments, the drive socket mating connection is one of a group consisting of a ¼" drive, ⅜" drive, ½" drive, or ¾" drive.

As will be obvious to anyone of skill in the art, numerous modifications to the features described and shown are possible. Accordingly, the described and illustrated embodiments are to be construed as merely exemplary of the inventive concepts expressed herein and addressed in the appended claims.

DETAILED DESCRIPTION OF THE INVENTION

The present non-ratcheting, multi-directional engagement apparatus, also called the Shaft Spring Clutch, greatly improves performance, user comfort, and ease of use in comparison to existing designs.

In the following description, numerous specific details are set forth to provide a more thorough description of embodiments of the Shaft Spring Clutch. It will be apparent, however, to one skilled in the art, that the embodiments of the Shaft Spring Clutch may be practiced without these specific details. In other instances, well known features have not been described in detail so as not to obscure the many benefits of the Shaft Spring Clutch.

Figure 1:
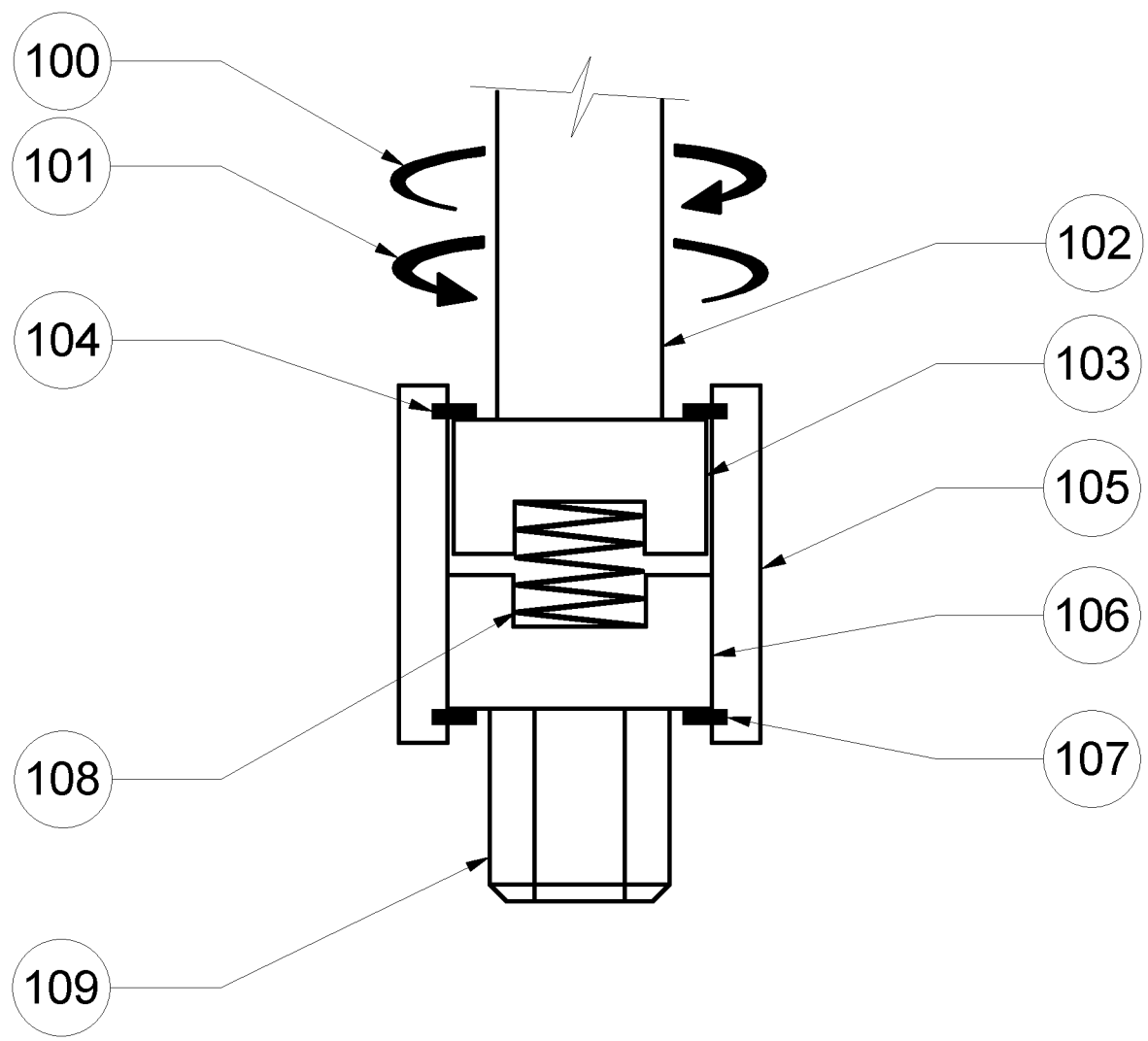
FIG. 1 is a cutaway side view of one possible embodiment of the Shaft Spring Clutch in a disengaged position.
Figure 2:
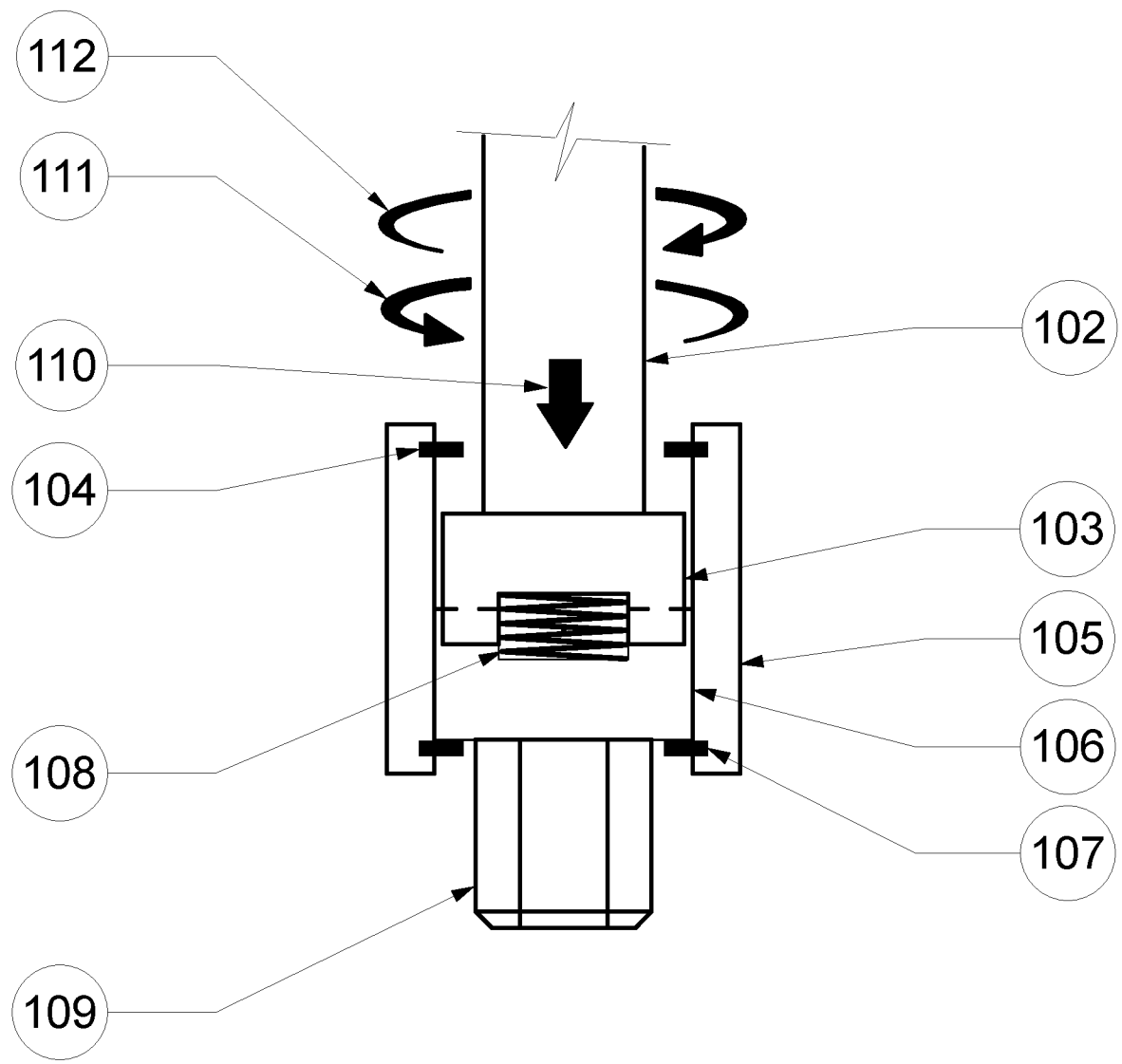
FIG. 2 is a cutaway side view of one possible embodiment of the Shaft Spring Clutch in an engaged position.

Referring first to FIGS. 1 and 2, which illustrate one possible embodiment of the Shaft Spring Clutch, an input shaft 102 is removably connected to a first drive member 103. Opposite the first drive member 103, a second drive member 106 is removably attached to a tool bit 109. Both drive members are contained within a bore of a guide housing 105, with the first drive member 103 free to rotate within the guide housing 105. In contrast, the second drive member 106, is fixedly connected to the guide housing 105 such that they rotate together. Both the first drive member 103, and second drive member 106, are kept within the guide housing 105 by a first snap ring 104 and a second snap ring 107. A return spring 108, is located between the first drive member 103 and second drive member 106, and the spring force of the return spring 108 forces the first drive member 103 and second drive member 106 apart and disengaged as shown in FIG. 1.

When disengaged, the input shaft 102, and first drive member 103 selectively attached thereto, may rotate freely relative to the other parts of the Shaft Spring Clutch assembly as illustrated by the unengaged clockwise rotation arrow 101 and unengaged counterclockwise rotation arrow 100.

FIG. 2 illustrates the same embodiment of the Shaft Spring Clutch in the engaged position. When axial force 110 is applied to the input shaft 102, the first drive member 103 is moved axially closer to the second drive member 106 until they are engaged. Once engaged, any rotational motion applied to the input shaft 102 will be translated to across the engaged drive members and to the tool bit 109. This motion is illustrated by the engaged clockwise rotation arrow 112 and engaged counterclockwise rotation arrow 111.

As may be readily ascertained, the first drive member 103 and second drive member 106 may engage using a variety of features including teeth, splines, friction pads, or magnets.

In addition, the tool bit 109 may be of any type commonly used to drive fasteners, for example the tool bit 109 may be slotted such as a slot drive, or cross drive; cruciform, such as a Phillips Head drive, Frearson drive, French Recess drive, JIS B 1012 drive, Mortoq drive, Pozidriv drive, Supadriv drive, Torq-set drive, or Phillips/Slotted drive; an external polygon such as a Square drive, Pent drive, Hex drive, or 12-point drive; an internal polygon such as a Tri-angle drive, Robertson drive, Hex socket drive, Security hex drive, Double-square drive, Triple-square drive, 12-spline flange drive, or Double hex drive; hexalobular such as a Torx drive, security Torx drive, Torx Plus drive, Polydrive, Torx ttap drive, External Torx drive, Line Head male drive, Line Head female drive, or Line Head Female tamper drive; three pointed such as a Tri-point drive, Tri-groove drive, or Tri-wing drive; or a special type such as a Clutch A drive, Clutch G drive, One-way drive, Bristol drive, Quadrex drive, Pentalobe drive, or Spanner head drive.

In addition to the above, the second drive member 106 may be designed so that instead of being designed for use with a drive bit, it can be attached to other types of drivers such as sockets, water meter valve keys, or sprinkler valve keys. For example, the second drive member 106 can be designed for mating with ¼", ⅜", ½", or ¾" drive sockets by using an adapter, a specially designed too bit 109, or by including the appropriately sized attachment point. Thus, the Shaft Spring Clutch can be used in place of a traditional ratchet.

Figure 3A:
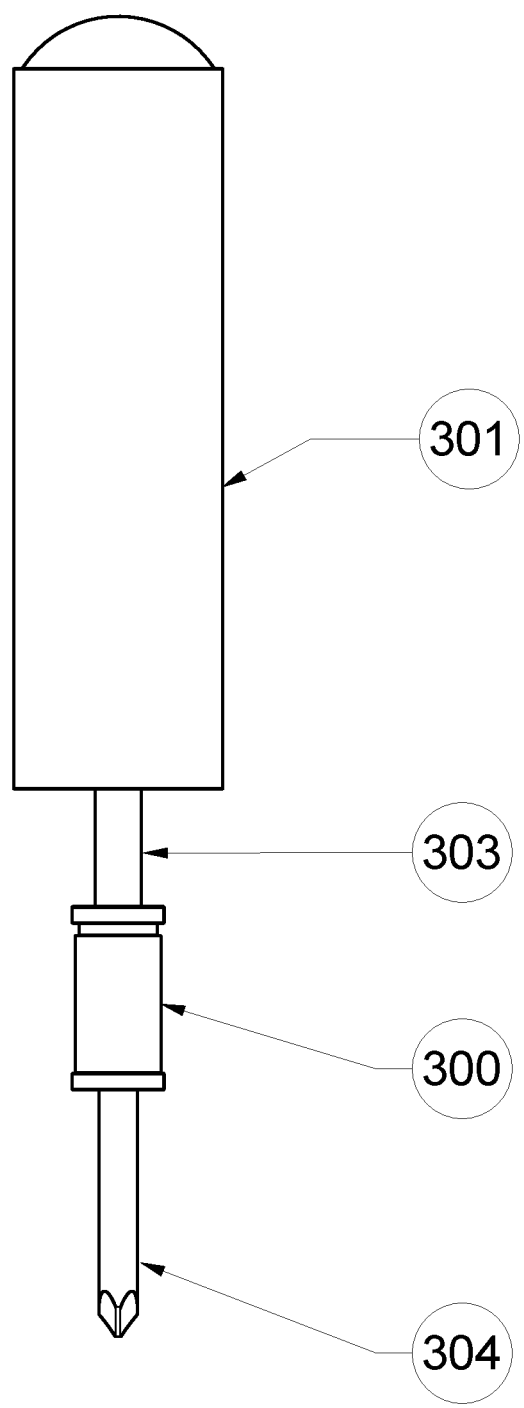
FIG. 3A is a side view of a possible embodiment of the Shaft Spring Clutch with handle shown.
Figure 3B:
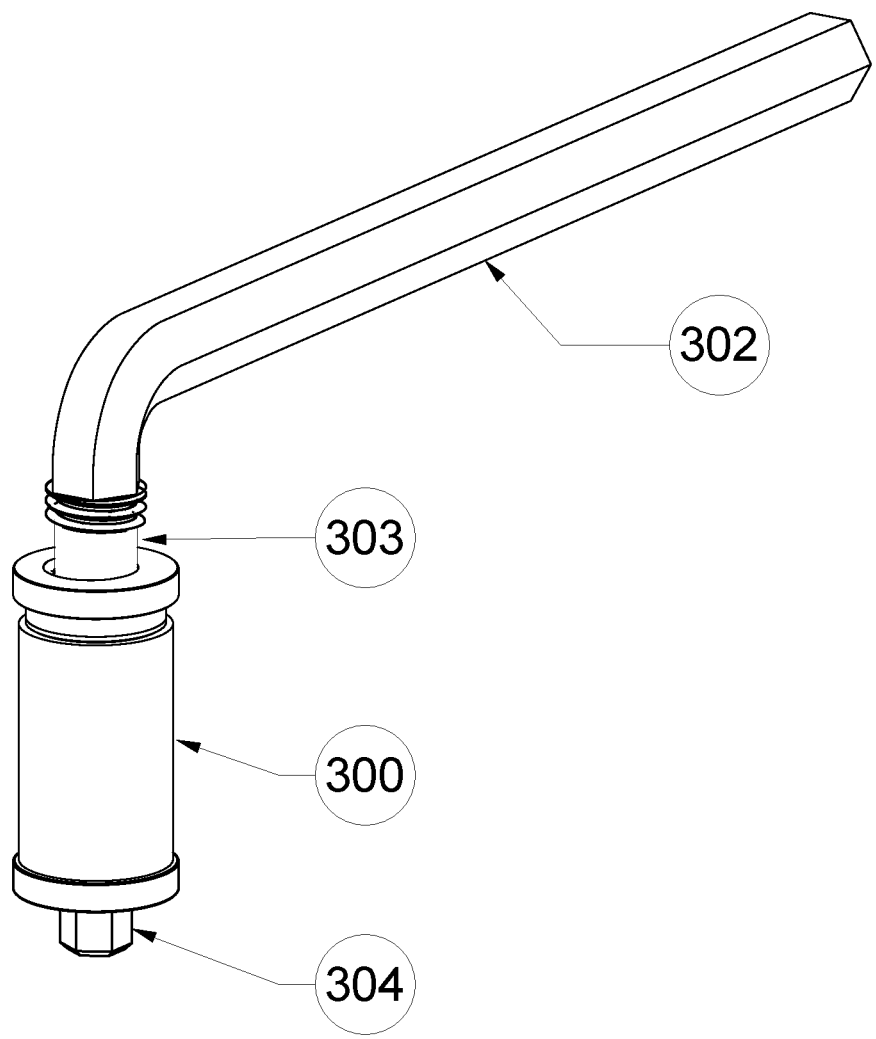
FIG. 3B is a perspective view of a possible embodiment of the Shaft Spring Clutch with handle shown.

Turning next to FIGS. 3A to 3B, which illustrate several possible handle designs, any embodiment of the Shaft Spring Clutch assembly 300 though shown as fixedly attached, may alternatively be removably attached to a variety of handles using the input shaft 303. In FIG. 3A, the handle 301 is shown as a commonly used screwdriver handle with the tool bit 304 shown as a Philips head screw drive.

In FIG. 3B, the handle 302 is shown as an "L" shaped handle, which allows more torque to be applied to the input shaft 303 and thereby to the tool bit 109. A handle of any type may be attached to the input shaft 303 using a threaded connection, a socket connection, a fastener, adhesive, material deformation or a quick connector. In addition, as can readily be ascertained from these illustrations and descriptions, almost any commonly used handle design can be used, for example a hexagonal cross-section handle, a square cross-section handle, an oval cross-section handle, a polygonal cross-section handle, an "L" shaped handle, or a "T" shaped handle.

Figure 3C:
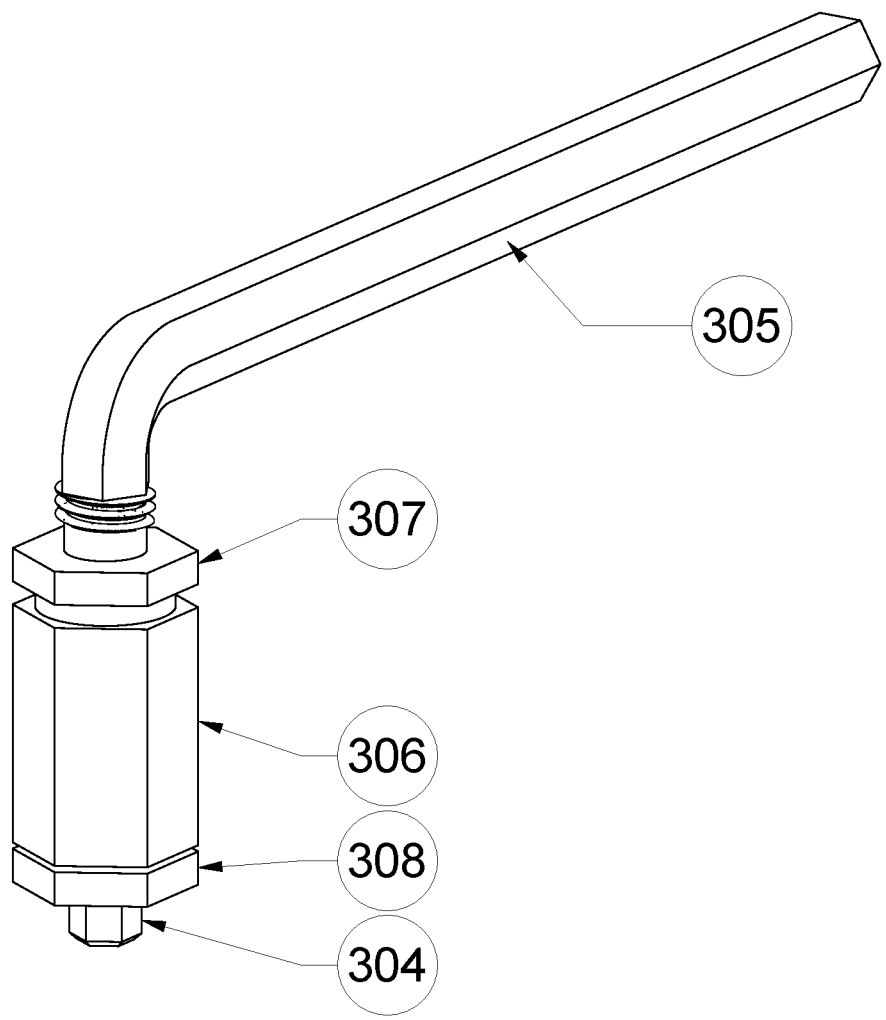
FIG. 3C is a perspective view of a possible embodiment of the Shaft Spring Clutch with handle shown.

FIG. 3C illustrates a possible embodiment of the Shaft Spring Clutch assembly wherein the external surface of the guide housing 306 has a hexagonal cross section such that a wrench, or other tool, may be used to grip the external surface of the guide housing 306 and turn the guide housing and drive bit 304, if fixedly attached to the guide housing, independently of the input shaft and handle 305. In addition, an outer circumference of the lower drive member 308 may also be hexagonal in cross section such that a wrench, or other tool, may be used to grip the outer circumference of the lower drive member 308 and turn it and drive bit 304, independently of the input shaft and handle 305.

Optionally, the outer circumference of the locker 307 may be hexagonal in cross section such that a wrench, or other tool, may be used to grip the outer circumference of the locker 307 to allow it to be rotated using the tool. This allows the clutch mechanism to be more tightly locked into the engaged position.

Figure 3D:
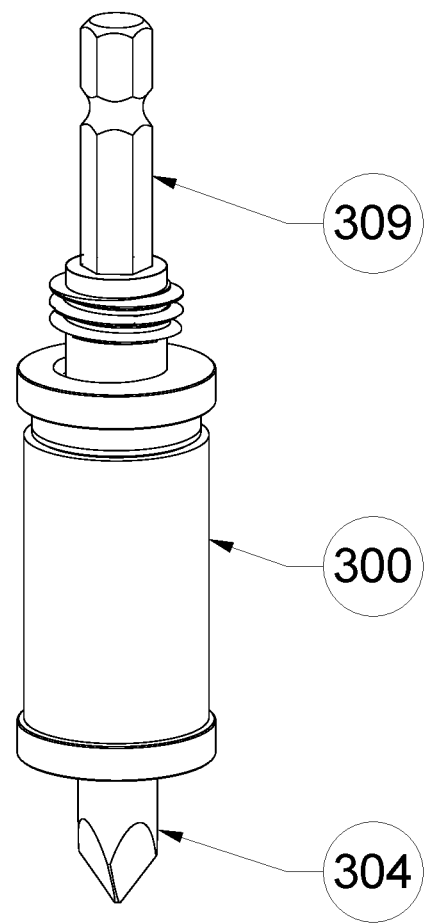
FIG. 3D is a perspective view of a possible embodiment of the Shaft Spring Clutch for use in power tool.

FIG. 3D illustrates a possible hex shank design on the input shaft 309 for use with any embodiment of the Shaft Spring Clutch, with the hex shank 309 being operable to mate with the chuck of most commonly used power tools such as power drills, impact drivers, power screwdrivers, and the like. In keeping with its intended use as a power tool attachment, the drive bit 304 in this embodiment is illustrated as a Philips head driver as commonly used to drive screws with power drills.

Figure 4:
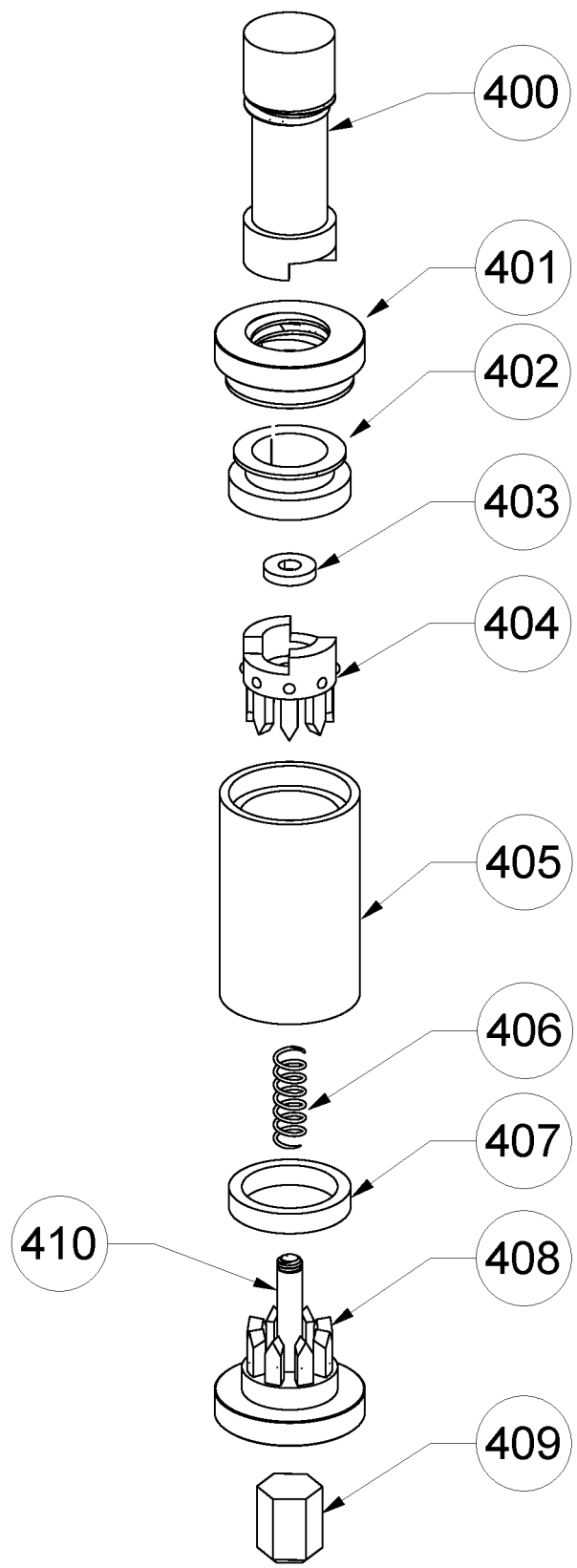
FIG. 4 is an exploded view of one embodiment of the Shaft Spring Clutch.
Figure 5:
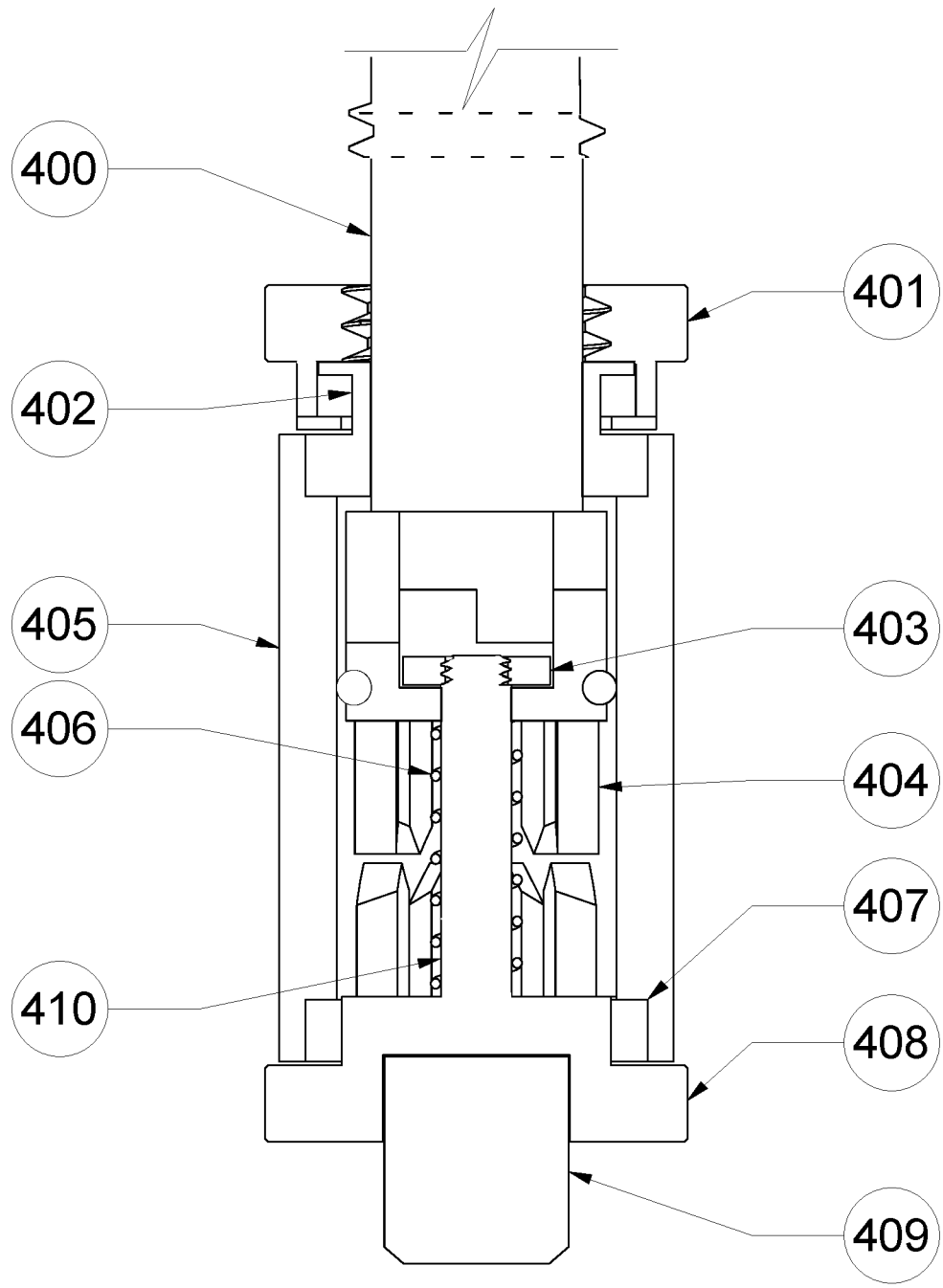
FIG. 5 is a cutaway side view of one embodiment of the Shaft Spring Clutch in a disengaged position.
Figure 6:
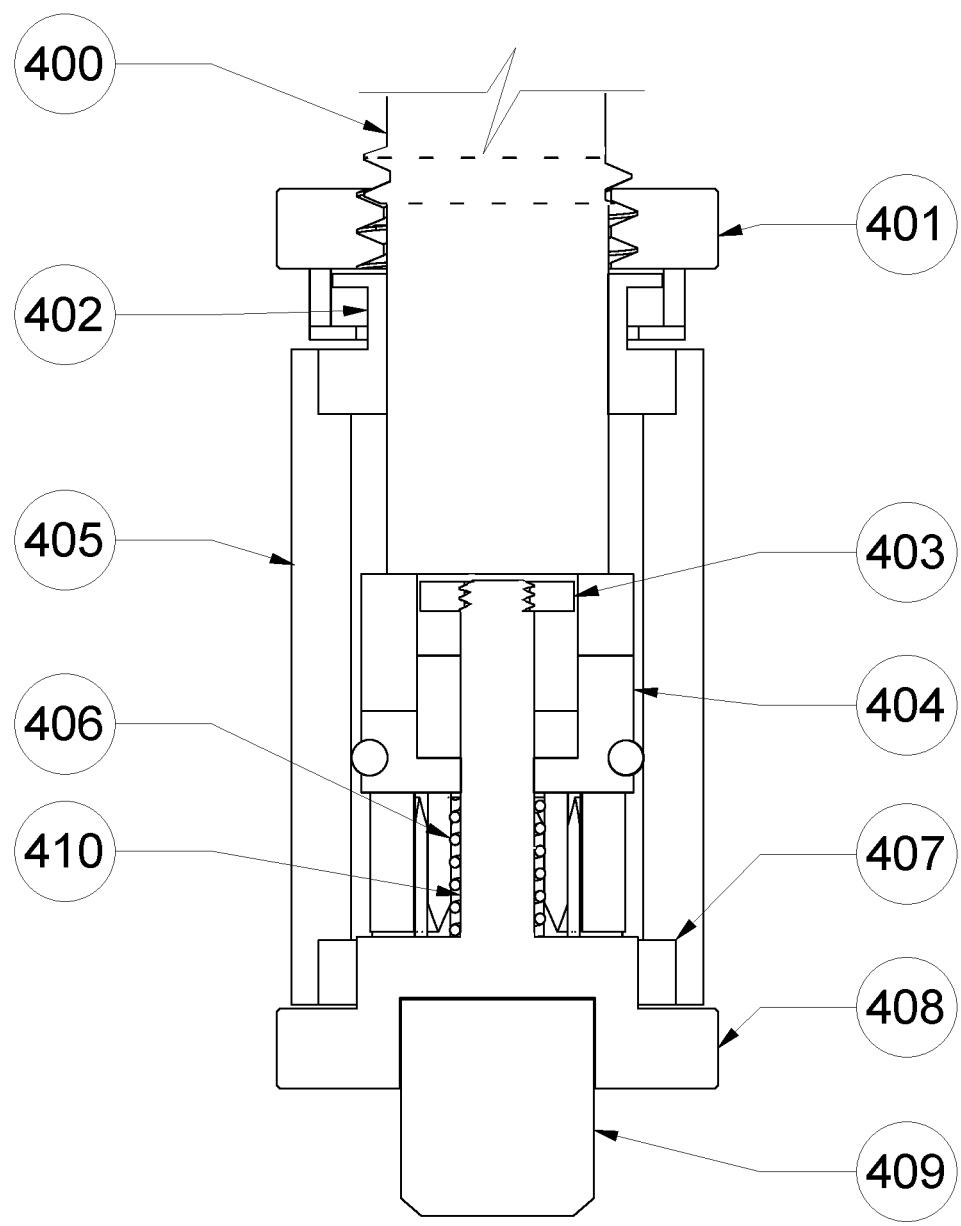
FIG. 6 is a cutaway side view of one embodiment of the Shaft Spring Clutch in an engaged position.

Moving now to FIGS. 4 to 6, which illustrate another possible embodiment of the Shaft Spring Clutch, an input shaft 400 is removably connected to a first drive gear 404. A second drive gear 408 is positioned opposite the first drive gear 404. Both the first drive gear 404 and second drive gear 408 are positioned within a bore of a gear guide housing 405. A bearing 407, illustrated here as a sleeve bearing, though it may be of any bearing type including ball bearings, roller bearing, needle bearings, or the like, or even omitted, is located in the guide housing 405 such that the outer diameter of the bearing 407 is in contact with the inner diameter of the guide housing 405 and the inner diameter of the bearing 407 is in contact with the smaller outer diameter of the second drive gear 408. This bearing 407 allows the second drive gear 408 to easily rotate and is fixed in the guide housing 405 by using a press fit.

In addition to its smaller outer diameter, the second drive gear 408 includes a larger outer diameter that is at least equal to, or greater than, the outer diameter of the guide housing 405. This outer diameter of the second drive gear 408 may be used to manually turn the second drive gear 408 free of rotation of the input shaft 400 when the drive gears are disengaged, or the whole assembly when the drive gears are engaged. The outside of the larger outer diameter may be knurled, or otherwise textured, be profiled for use with wrenches, or other gripping aids like handles added, to aid in gripping and turning.

A return spring 406 is positioned between the first drive gear 404 and second drive gear 408, the spring force of which is enough to hold both drive gears in a disengaged position. A spring guide shaft 410 is integral to the second drive gear 408 and fits through the inner diameter of the return spring 406. A plunger 403 is attached to one end of the spring guide shaft 410, using a threaded connection, and is contained within a bore defined by a bore in the input shaft 400 and a large bore in the first drive gear 404 with the bores not extending fully through either the input shaft 400 or first drive gear 404. A second smaller bore allows the spring guide shaft 410 to pass through the first drive gear 404.

A tool bit 409 is removably connected to the second drive gear 408 and is operable to drive fasteners. As may be clearly ascertained, the tool bit 409 may be of any type commonly used to drive fasteners, examples of which are listed above, with size being the only constraining factor on its design.

In addition, a locker 401 and locker retainer 402 are located above the first drive gear 404. The inner diameter of the locker 401 is threaded with a matching thread located on the outer diameter of the input shaft 400. The locker retainer 402 is fixedly connected to the guide housing 405, shown here as a press fit, though it may be threaded, welded, or similarly connected, with the input shaft 400 passing through it. Both the locker 401 and locker retainer 402 are interconnected using overlapping extrusions which constrain the total axial movement of the locker 401 and locker retainer 402 relative to each other. As may be readily ascertained, the locker 401 and locker retainer 402 may be interconnected using a variety of other methods including using pins and slots, or elastic connectors, such as rubber bands.

When engaged to the threads located on the outer diameter of the input shaft 400, the threads on the locker 401 move the input shaft 400 axially toward the second drive member 408. This in turn, engages the first drive gear 404 with the second drive gear 408, thus locking the Shaft Spring Clutch assembly into an engaged position.

While in a disengaged configuration, as illustrated in FIG. 5, the teeth of the first drive gear 404 and the teeth of the second drive gear 408 are clear of each other allowing free rotation of the tool bit 409 and input shaft 400 relative to each other. In contrast, when in an engaged configuration, as illustrated in FIG. 6, the teeth of the first drive gear 404 and the teeth of the second drive gear 408 are engaged together thereby translating any rotation of the input shaft 400 to the tool bit 409.

Figure 7:
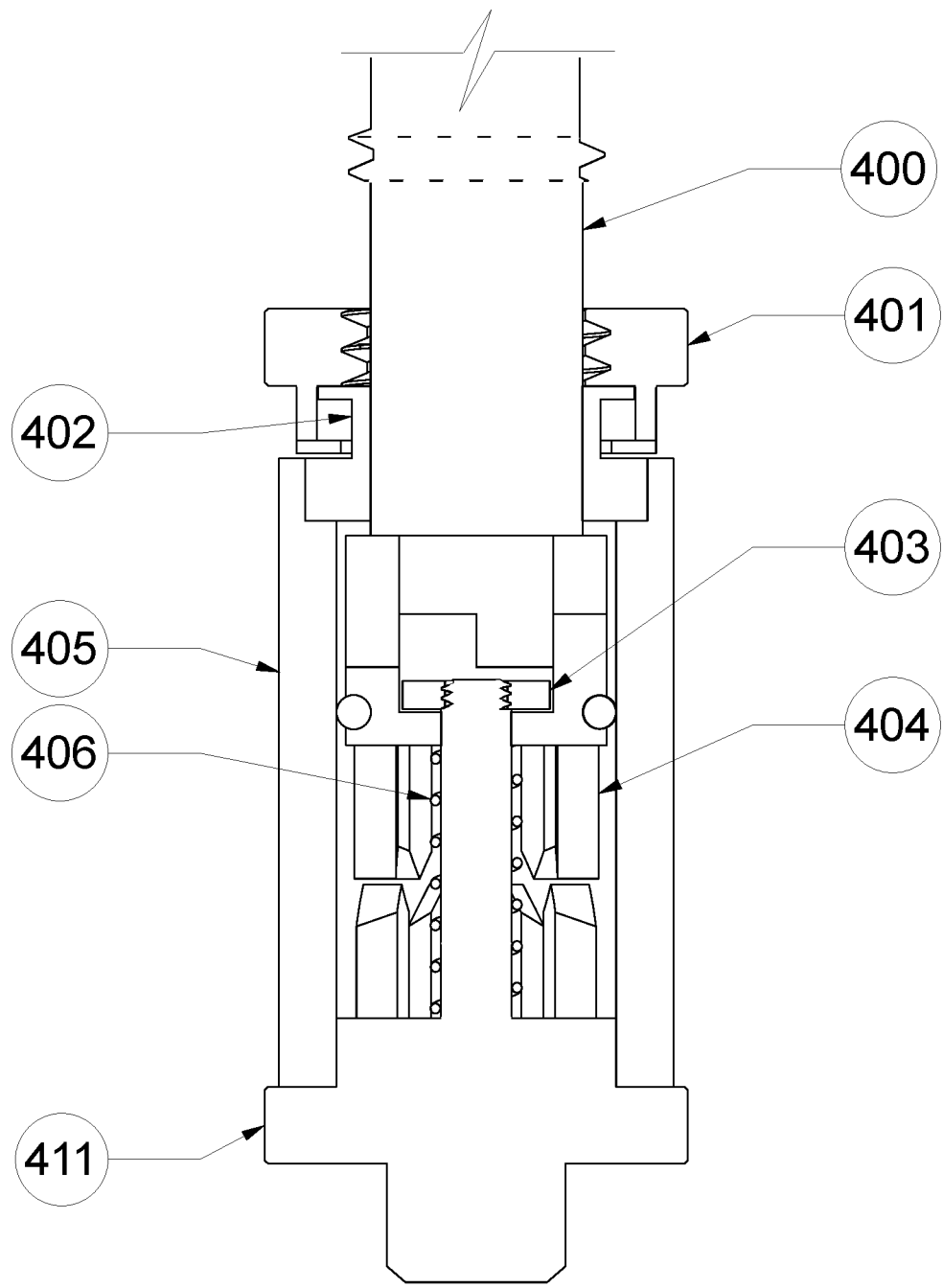
FIG. 7 is a cutaway side view of one embodiment of the Shaft Spring Clutch in a disengaged position with a one-piece drive bit.

Turning next to FIG. 7, which illustrates another possible embodiment of the Shaft Spring Clutch, wherein the tool bit 409 and second drive gear 408 are created from a single piece of material as illustrated the single-piece drive gear 411.

Figure 8:
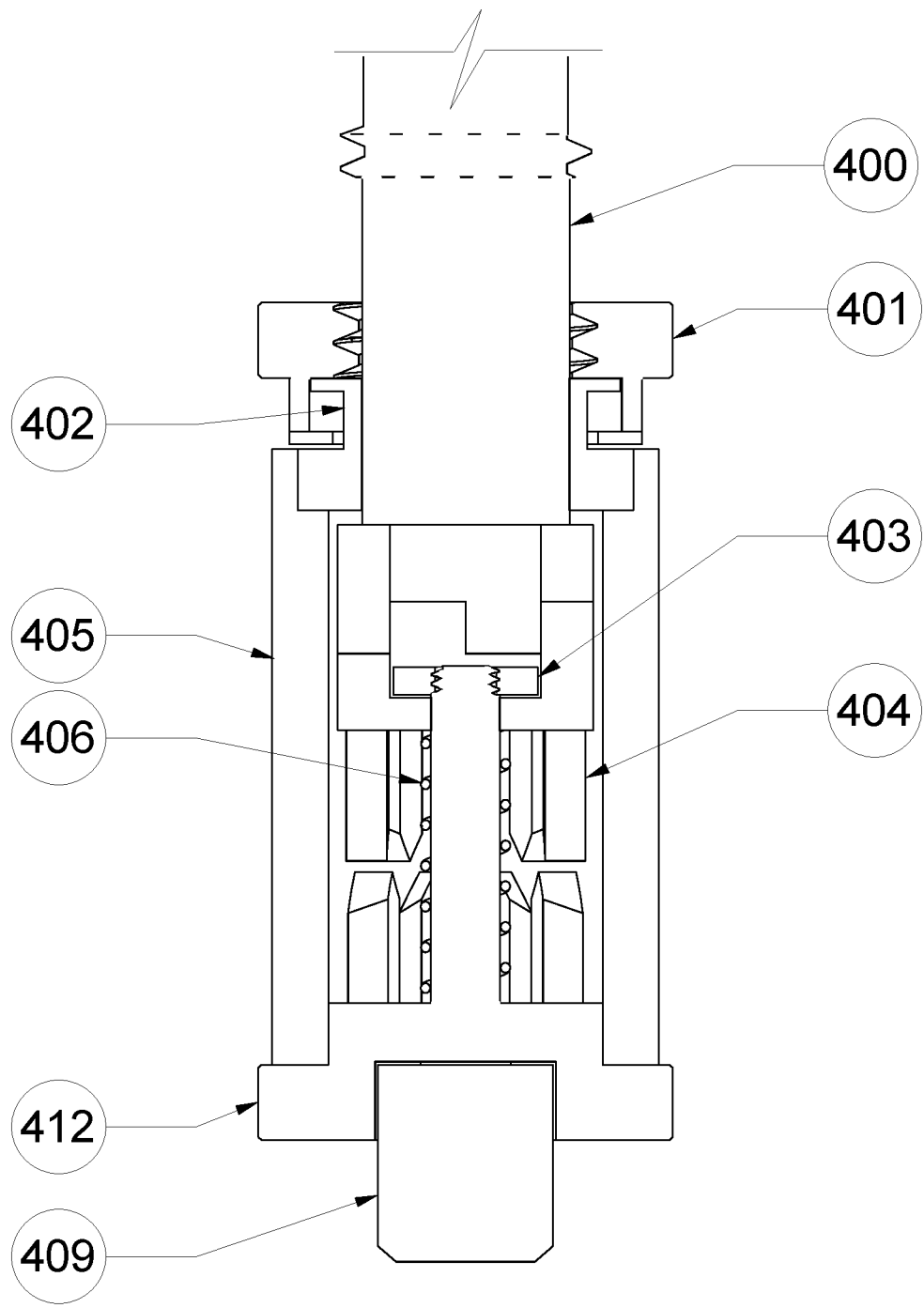
FIG. 8 is a cutaway side view of one embodiment of the Shaft Spring Clutch in a disengaged position without bearings.

Next FIG. 8 illustrates another possible embodiment of the Shaft Spring Clutch, wherein the ball bearing on the first drive gear 404 and bearing 407 are omitted.

Figure 9:
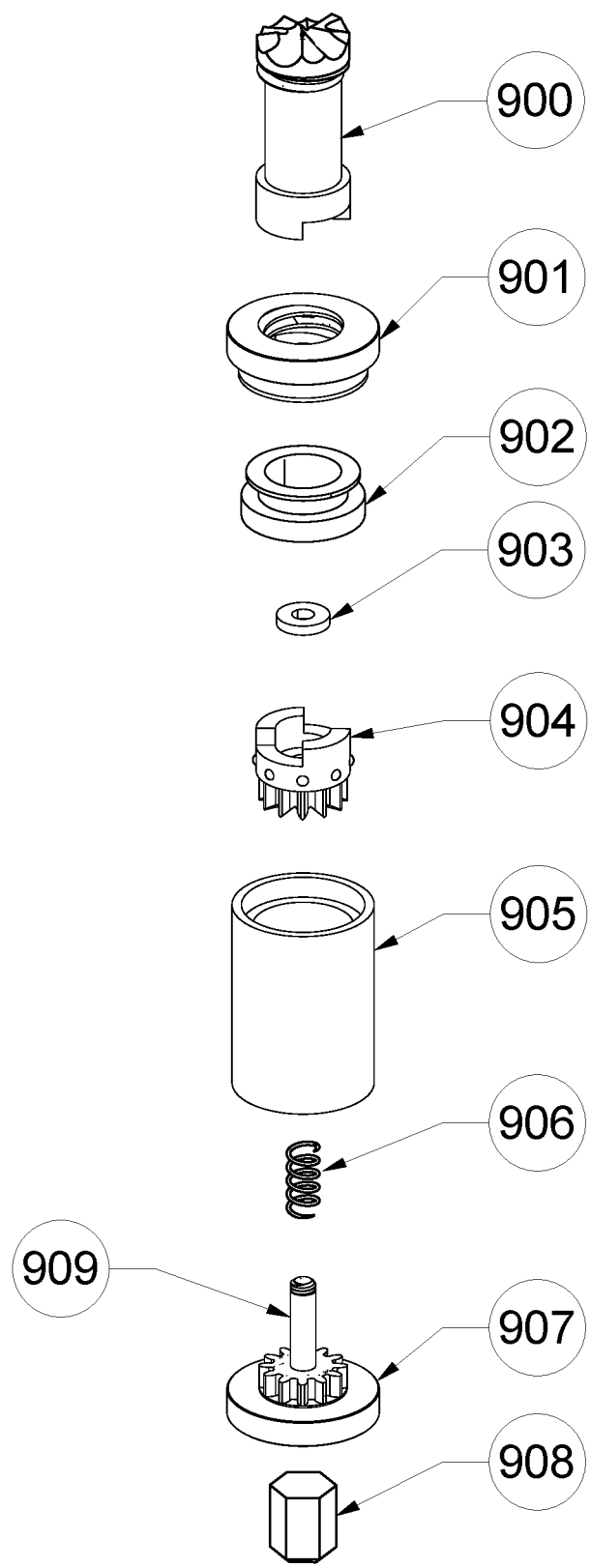
FIG. 9 is an exploded view of one embodiment of the Shaft Spring Clutch.
Figure 10:
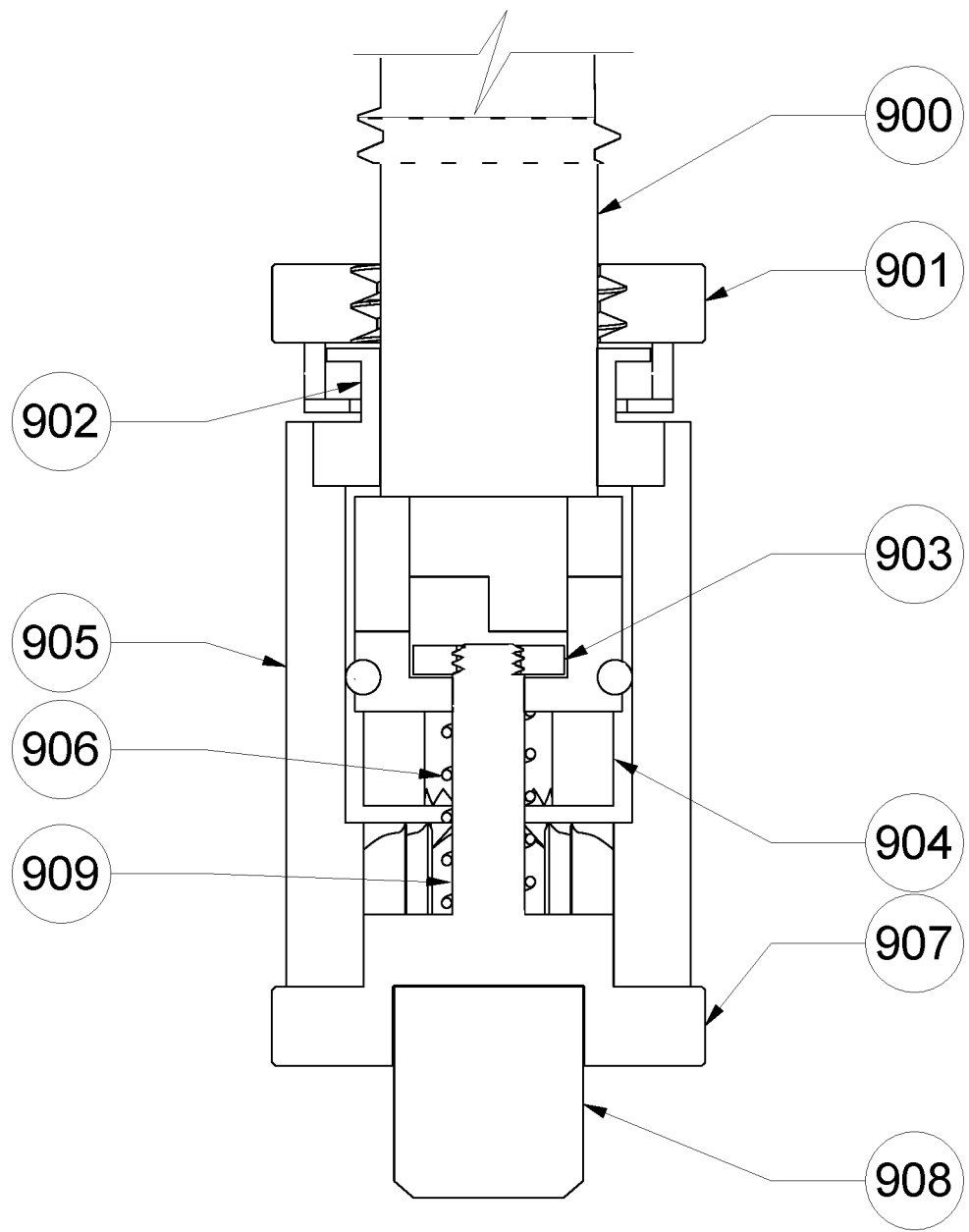
FIG. 10 is a cutaway side view of one embodiment of the Shaft Spring Clutch in a disengaged position.
Figure 11:
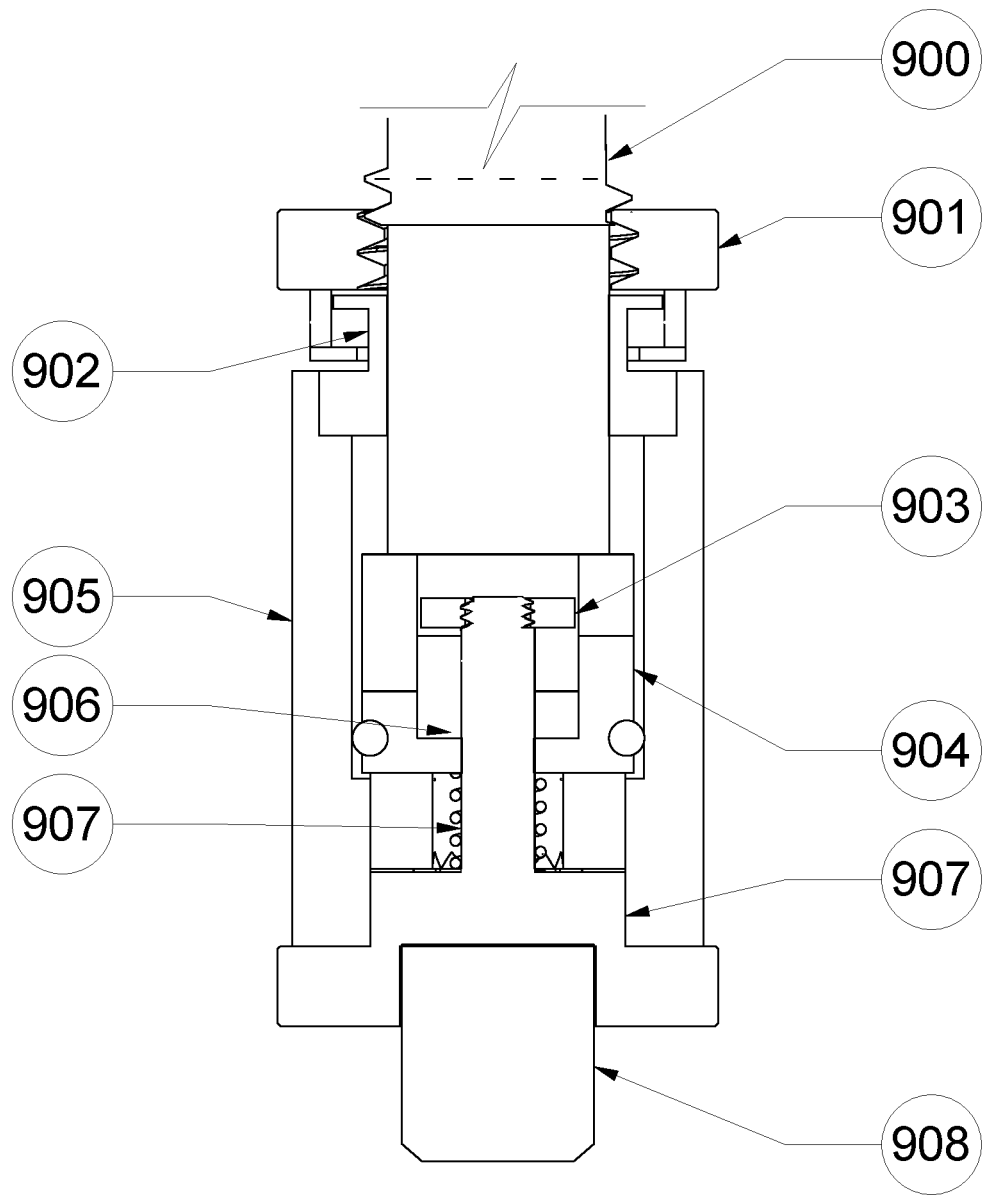
FIG. 11 is a cutaway side view of one embodiment of the Shaft Spring Clutch in an engaged position.

Referring now to FIGS. 9-11, which illustrate another possible embodiment of the Shaft Spring Clutch, an input shaft 900 is removably connected to a first spline drive shaft 904. A second spline drive shaft 907 is positioned opposite the first spline drive shaft 904. Both the first spline drive shaft 904 and second spline drive shaft 907 are positioned within a bore of a spline guide housing 905. The spline guide housing 905 has splines located in its internal diameter, which are configured to removably mate with splines on both the spline drive shaft 904 and second spline drive shaft 907.

The second spline drive shaft 907 includes a larger outer diameter that is at least equal to, or greater than, the outer diameter of the guide housing 905. This outer diameter of the second spline drive shaft 907 may be used to manually turn the second spline drive shaft 907 free of rotation of the input shaft 900 when the drive gears are disengaged, or the whole assembly when the splines are engaged. This feature may also be knurled, or otherwise textured, or other gripping aids like handles added, to aid in gripping and turning.

A return spring 906 is positioned between the first spline drive shaft 904 and second spline drive shaft 907, the spring force of which is enough to hold both spline drive shafts in a disengaged configuration. A spring guide shaft 909 is integral to the second spline drive shaft 907 and fits through the inner diameter of the return spring 906. A plunger 903 is attached, using a threaded connection, to one end of the spring guide shaft 909 and is contained within a bore defined by a bore in the input shaft 900 and a large bore in the first spline drive shaft 904 with the bores not extending fully through either the input shaft 900 or first spline drive shaft 904. A second smaller bore allows the spring guide shaft 909 to pass through the first spline drive shaft 904.

A tool bit 908 is removably connected to the second spline drive shaft 907 and is operable to drive fasteners. As may be clearly ascertained, the tool bit 908 may be of any type commonly used to drive fasteners, examples of which are listed above, with size being the only constraining factor on its design.

In addition, a locker 901 and locker retainer 902 are located above the first spline drive shaft 904. The inner diameter of the locker 901 is threaded with a matching thread located on the outer diameter of the input shaft 900. The locker retainer 902 is fixedly connected to the guide housing 905, shown here as a press fit though it may be threaded, welded, or similarly connected, with the input shaft 900 passing through it. Both the locker 901 and locker retainer 902 are interconnected using overlapping extrusions which constrain the total movement of the locker 901 and locker retainer 902 relative to each other. As may be readily ascertained, the locker 901 and locker retainer 902 may be interconnected using a variety of other methods, with examples listed above.

When engaged to the threads located on the outer diameter of the input shaft 900, the threads on the locker 901 move the input shaft 900 axially toward the second spline drive shaft 907. This in turn, engages the first spline drive shaft 904 with the second spline drive shaft 907, thus locking the Shaft Spring Clutch assembly into an engaged position.

While in a disengaged configuration, as illustrated in FIG. 8, the splines of the first spline drive shaft 904 are disengaged from the splines of the spline guide housing 905, which are engaged with the splines of the second spline drive shaft 907, thus allowing free rotation of the tool bit 908 and input shaft 900 relative to each other. In contrast, when in an engaged configuration, as illustrated in FIG. 9, the splines of the first spline drive shaft 904 engage the splines of the spline guide housing 905, which are engaged with the splines of the second spline drive shaft 907, thereby translating any rotation of the input shaft 900 to the tool bit 908.

Figure 12:
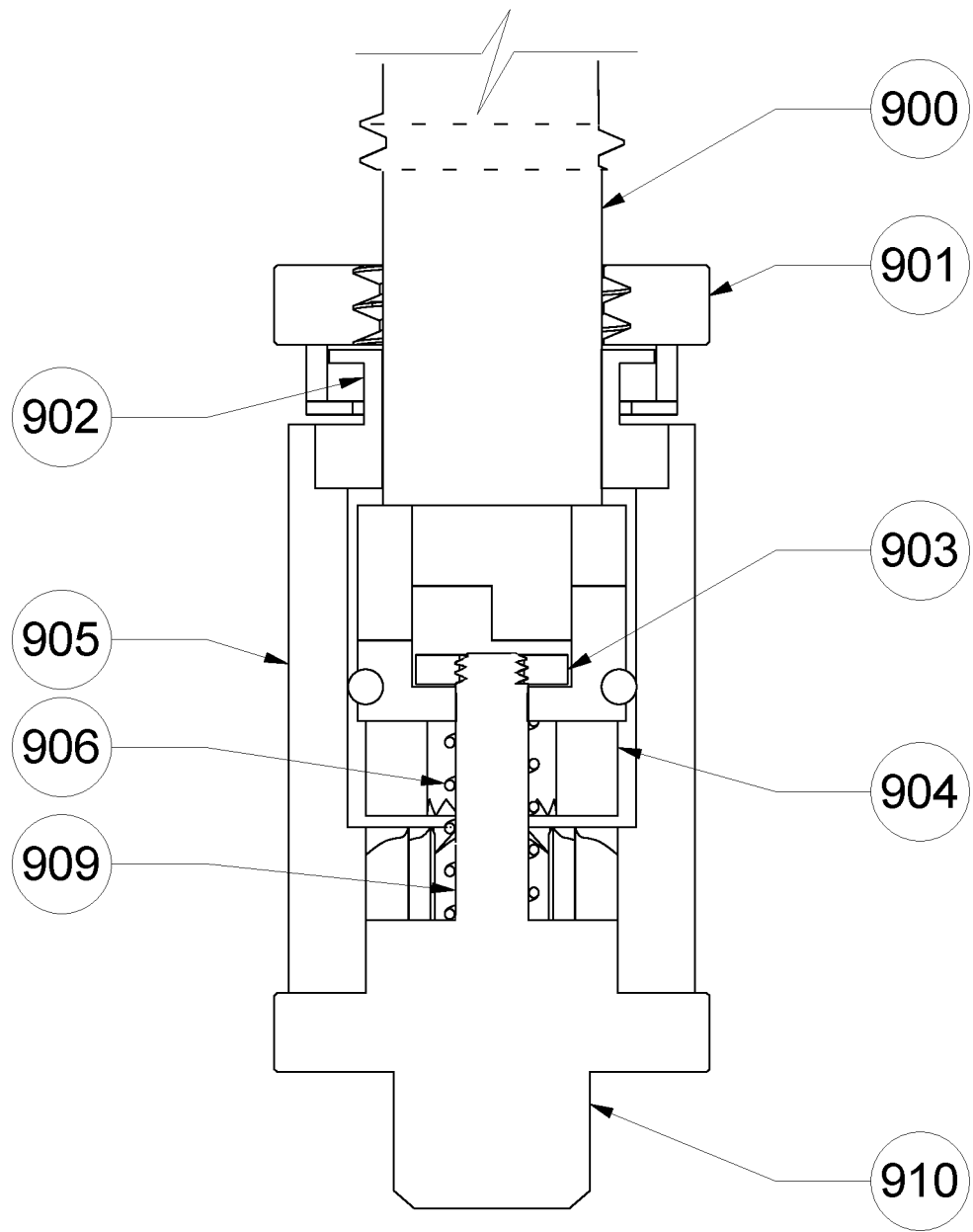
FIG. 12 is a cutaway side view of one embodiment of the Shaft Spring Clutch in a disengaged position with one-piece drive bit.

Turning next to FIG. 12, which illustrates another possible embodiment of the Shaft Spring Clutch, wherein the tool bit 908 second spline drive shaft 907 are created from a single piece of material as illustrated the single-piece drive gear 910.

Figure 13:
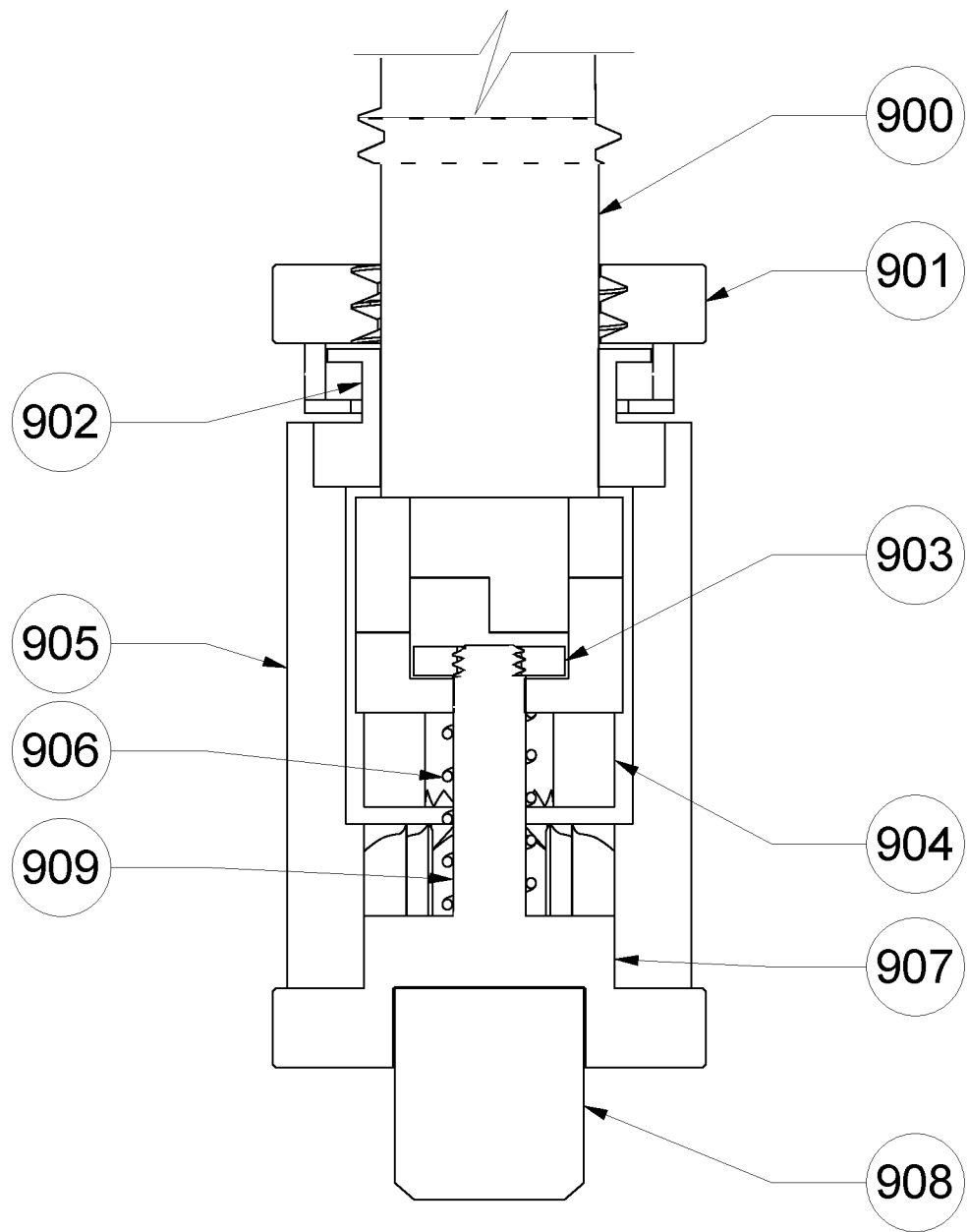
FIG. 13 is a cutaway side view of one embodiment of the Shaft Spring Clutch in a disengaged position with no bearings.

Next FIG. 13 illustrates another possible embodiment of the Shaft Spring Clutch, wherein the ball bearing on the first spline drive shaft 904 are omitted.

Figure 14:
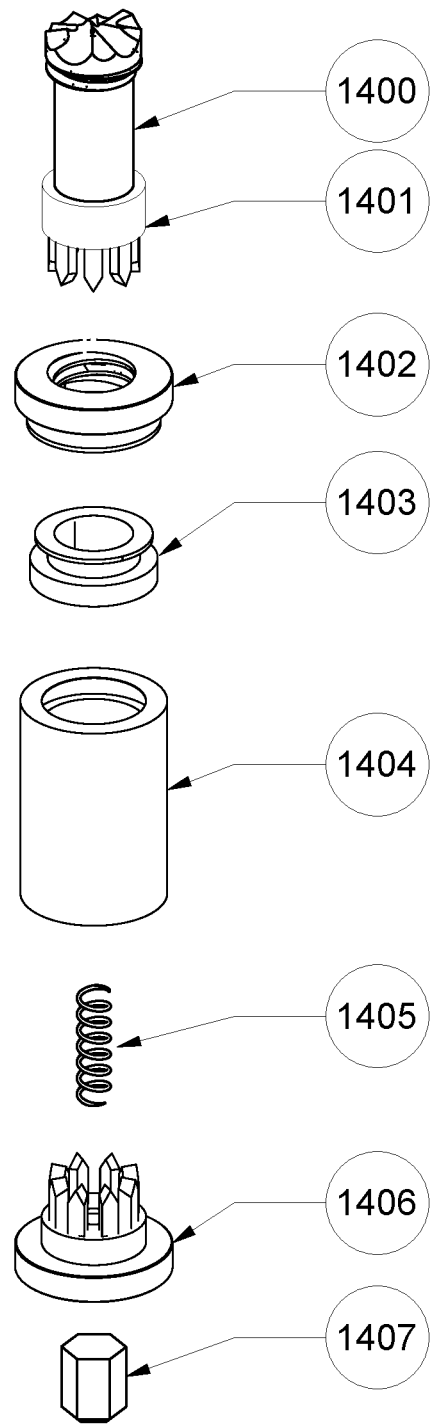
FIG. 14 is an exploded view of one embodiment of the Shaft Spring Clutch.
Figure 15:
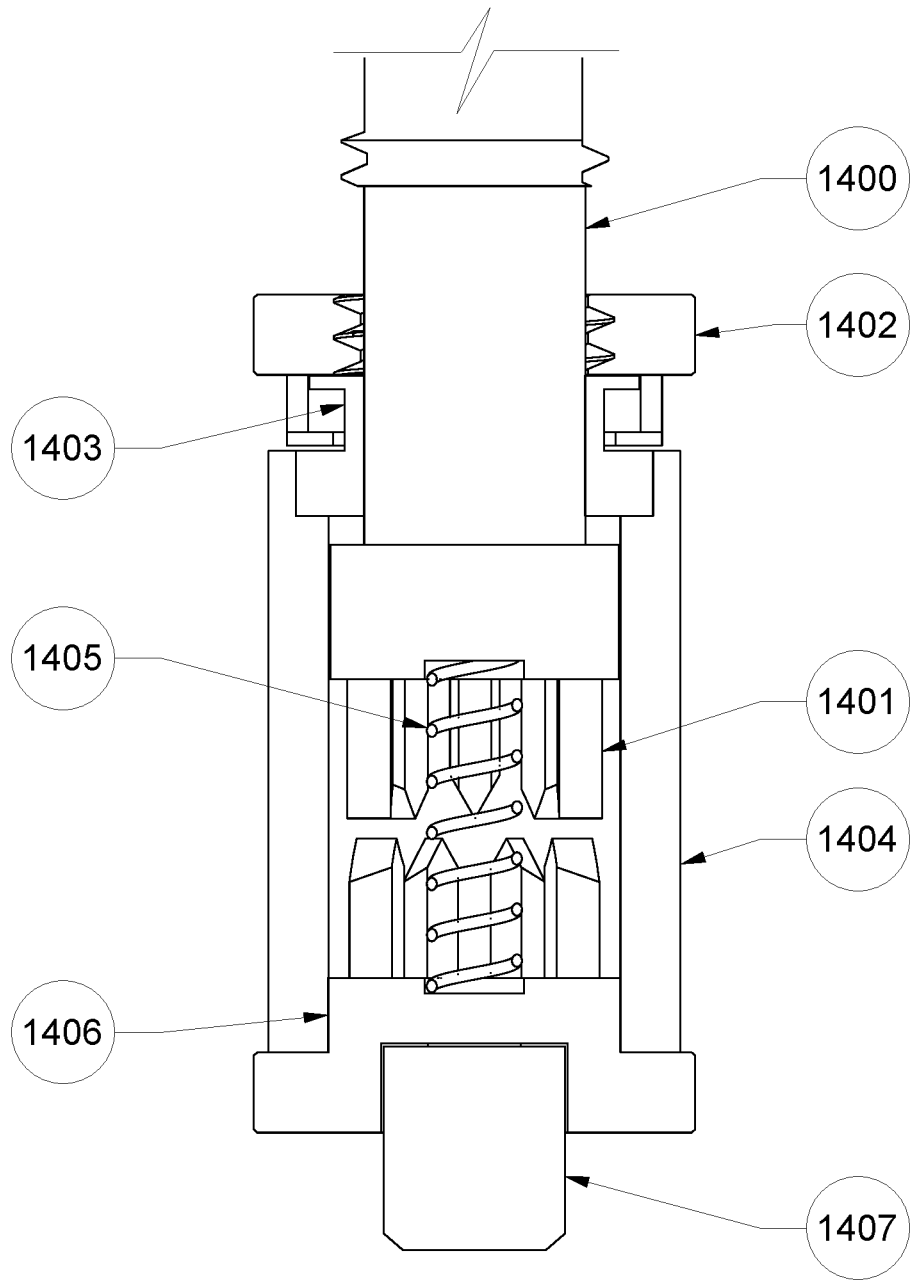
FIG. 15 is a cutaway side view of one embodiment of the Shaft Spring Clutch in a disengaged position.
Figure 16:
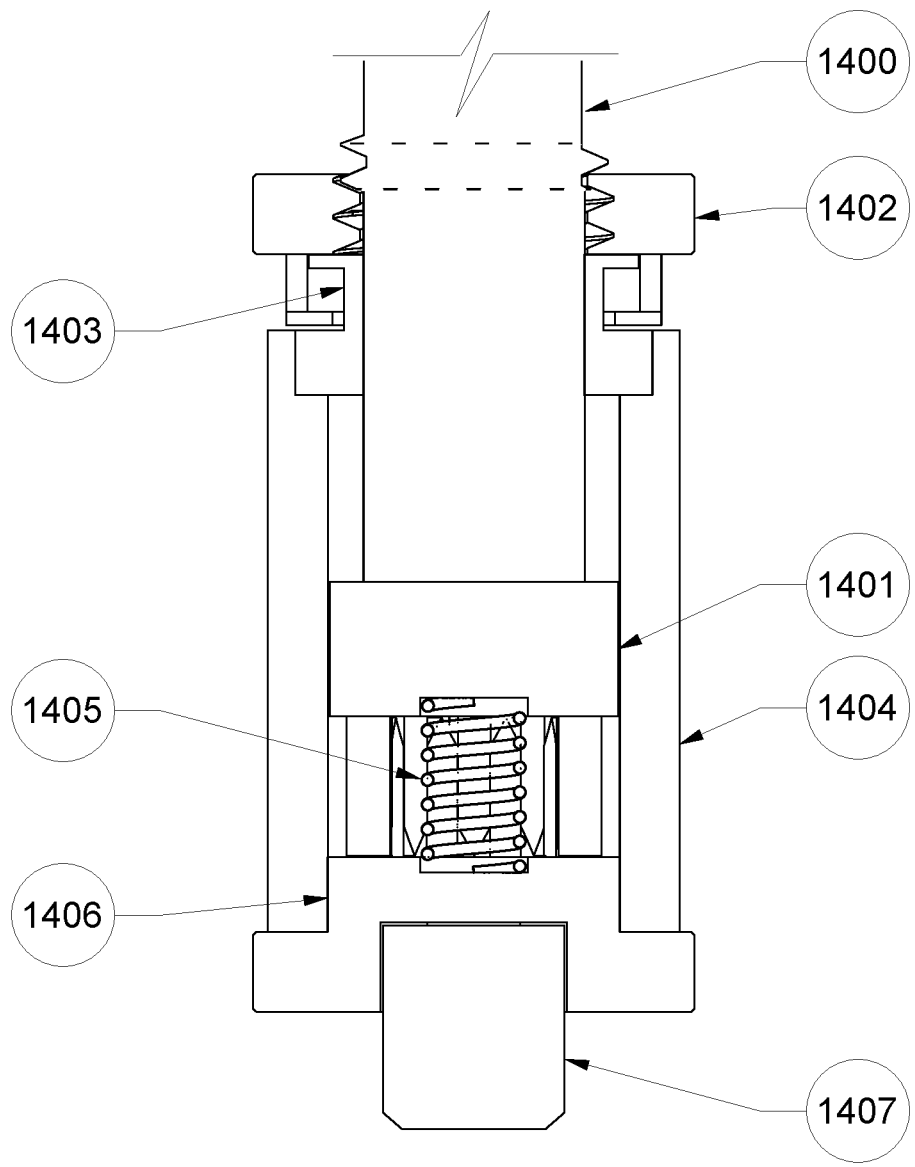
FIG. 16 is a cutaway side view of one embodiment of the Shaft Spring Clutch in an engaged position.

Referring now to FIGS. 14-16, which illustrate another possible embodiment of the Shaft Spring Clutch, wherein the input shaft 1400 and first drive gear 1401 are one-piece and are axially located inside an inner bore of a guide housing 1404. The second drive gear 1406 is press fit into the guide housing 1404 and is removably connected to a tool bit 1407. The first drive gear 1401 and second drive gear 1406 are held in a normally disengaged position by a spring 1405.

During operation, to engage the first drive gear 1401 and second drive gear 1406, axial force is applied to the input shaft 1400 and first drive gear 1401 sufficient to overcome the spring force of the spring 1405. Once engaged, any rotational force or motion applied to the input shaft 1400 and first drive gear 1401 is transmitted to the second drive gear 1406 and to the tool bit 1407. Thus, allowing the tool bit 1407 to drive a fastener or other mechanism.

The input shaft 1400 and first drive gear 1401 and second drive gear 1406 may be locked in an engaged position using the locker 1402 and locker retainer 1403. The input shaft 1400 has male threading located on the outer diameter of its shaft a set distance from the locker 1402. The locker 1402 has female threads on its inner diameter that match the male threads on the input shaft 1400. When threaded onto the input shaft 1400 the locker 1402 constrains the axial movement of input shaft 1400 and is in turn axially constrained by the locker retainer 1403. In addition to constraining axial movement, the locker 1402 forces the input shaft 1400 and first drive gear 1401 into an engaged position with the second drive gear 1406. Thus, the Shaft Spring Clutch can be manually locked in an engaged position for operation similar to that of a fixed tool.

Figure 17:
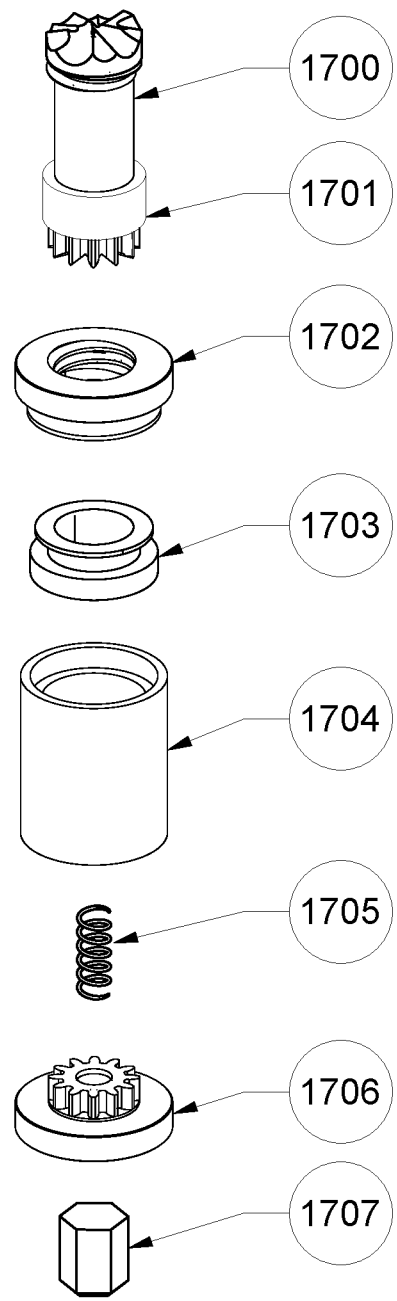
FIG. 17 is an exploded view of one embodiment of the Shaft Spring Clutch.
Figure 18:
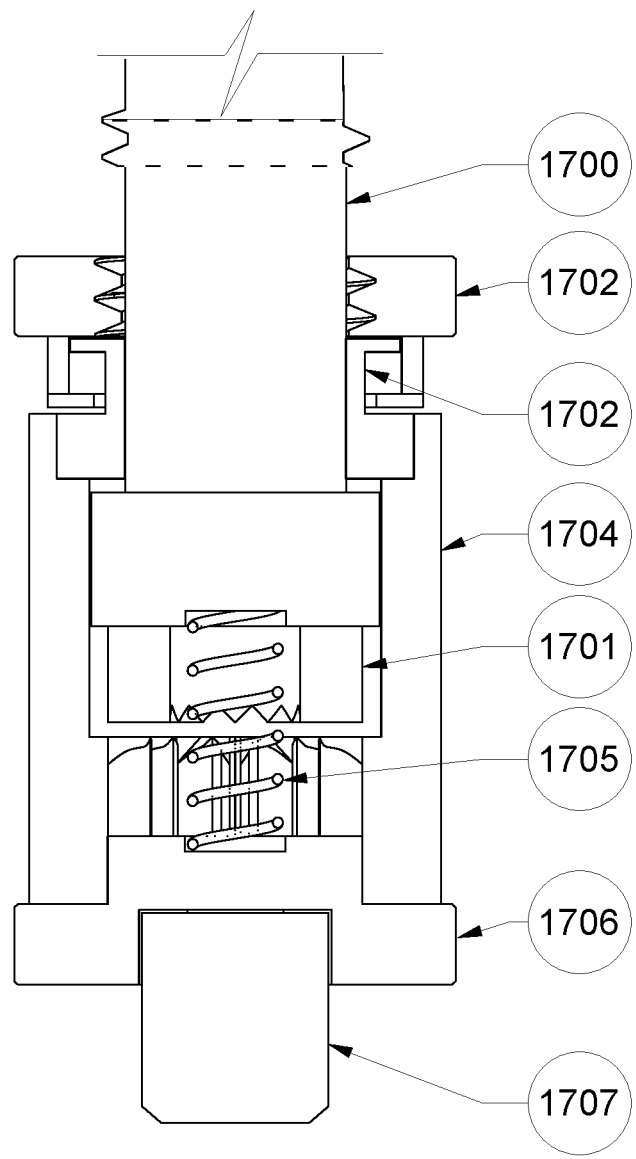
FIG. 18 is a cutaway side view of one embodiment of the Shaft Spring Clutch in a disengaged position.
Figure 19:
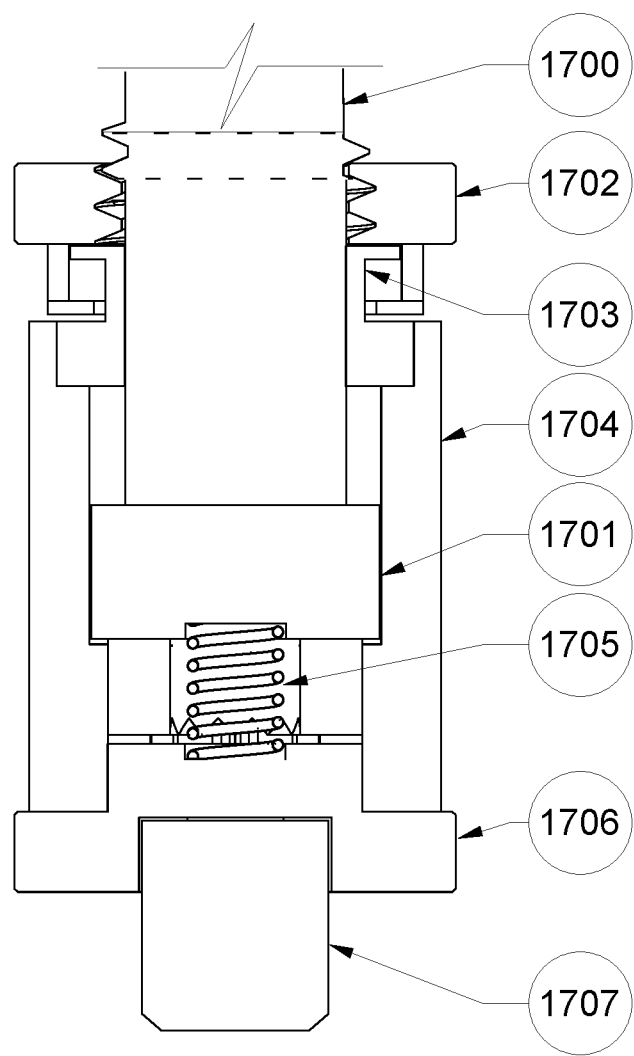
FIG. 19 is a cutaway side view of one embodiment of the Shaft Spring Clutch in an engaged position.

Referring now to FIGS. 17-18, which illustrate another possible embodiment of the Shaft Spring Clutch, wherein the input shaft 1700 and first spline drive shaft 1701 are one piece and are axially located inside an inner bore of a guide housing 1704. The first spline drive shaft 1701 is splined with male splines. A portion of the inner bore of the guide housing 1704 is splined operable to match the splines on the first spline drive shaft 1701 splines.

A second spline drive 1706 is located opposite the first spline drive shaft 1701 and has a splined section that is operable to mate with the splined section of the guide housing 1704. A tool bit 1707 is removably connected to the second spline drive 1706. The first spline drive shaft 1701 and second spline drive 1706 are held in a normally disengaged position by a spring 1705.

During operation, to engage the first spline drive shaft 1701 and second spline drive 1706, axial force is applied to the input shaft 1700 and thereby to the first spline drive shaft 1701 sufficient to overcome the spring force of the spring 1705. Once engaged, any rotational force or motion applied to the input shaft 1700 and thereby to the first spline drive shaft 1701 is transmitted to the second spline drive 1706 and to the tool bit 1707. Thus, allowing the tool bit 1707 to drive a fastener or other mechanism.

The first spline drive shaft 1701 and second spline drive 1706 may be locked in an engaged position using the locker 1702 and locker retainer 1703. The input shaft 1700 has male threading located on the outer diameter of its shaft a set distance from the locker 1702. The locker 1702 has female threads on its inner diameter that match the male threads on the input shaft 1700. When threaded onto the input shaft 1700, the locker 1702 constrains the axial movement of input shaft 1700 and is in turn axially constrained by the locker retainer 1703. In addition to constraining axial movement, the locker 1702 forces the first spline drive shaft 1701 into an engaged position with the second spline drive 1706 by forcing the input shaft 1700 toward the second spline drive 1706. Thus, the Shaft Spring Clutch can be manually locked in an engaged position for operation similar to that of a fixed tool.

Numerous modifications to the features described and shown are possible. Accordingly, the described and illustrated embodiments are to be construed as merely exemplary of the inventive concepts expressed herein and addressed in the appended claims.

What is claimed is:

1. An apparatus for selective rotation between drive members comprising:
   a first drive member with a first end and a second end;
   a second drive member with a first end and a second end, wherein said first drive member first end is configured to engage said second drive member first end;
   an input shaft with a first end and a second end, wherein said input shaft first end is connected to said first drive member second end;
   at least one return spring, wherein said return spring is located between said first drive member and said second drive member;
   a tool bit with a first end and a second end, wherein said tool bit first end is connected to said second drive member second end, and said tool bit second end is operable to drive fasteners;
   a guide housing with a first end, a second end, and an inner passageway, wherein said first drive member and said second drive member are located inside said inner passageway;
   a retaining means for constraining axial movement of said first drive member and said second drive member within said inner passageway of said guide housing; and
   a handle, wherein said handle is connected to said input shaft second end.

2. An apparatus according to claim 1, wherein said first drive member and said second drive member are configured to engage using at least one of a group consisting of teeth, splines, friction pads, or magnets.

3. An apparatus according to claim 1, wherein said retaining means comprises at least one of a group consisting of snap rings, pins, a threaded insert, an internal feature of said inner passageway, welds, or fasteners.

4. An apparatus according to claim 1, wherein said tool bit second end is operable to drive fasteners using at least one of a group of screw drives consisting of a slot drive, cross drive, Phillips Head drive, Frearson drive, French Recess drive, JIS B 1012 drive, Mortoq drive, Pozidriv drive, Supadriv drive, Torq-set drive, Phillips/Slotted drive, Square drive, Pent drive, Hex drive, 12-point drive, Tri-angle drive, Robertson drive, Hex socket drive, Security hex drive, Double-square drive, Triple-square drive, 12-spline flange drive, Double hex drive, Torx drive, security Torx drive, Torx Plus drive, Polydrive drive, Torx ttap drive, External Torx drive, Line Head male drive, Line Head female drive, Line Head Female tamper drive, Tri-point drive, Tri-groove drive, Tri-wing drive, Clutch A drive, Clutch G drive, One-way drive, Bristol drive, Quadrex drive, Pentalobe drive, or Spanner head drive.

5. An apparatus according to claim 1, wherein said tool bit second end is operable to open or close valves using at least one of a group consisting of a sprinkler fork valve key or water meter valve key.

6. An apparatus according to claim 1, wherein said tool bit first end is either fixedly connected or removably connected to said second drive member second end.

7. An apparatus according to claim 1 further comprising:
   an attachment mechanism for attaching said input shaft second end to a power tool chuck or attachment point, wherein said attachment mechanism is a hex shank connector.

8. An apparatus according to claim 1, wherein said handle comprises at least one of a group consisting of a circular cross-section handle, a hexagonal cross-section handle, a square cross-section handle, an oval cross-section handle, a polygonal cross-section handle, an "L" shaped handle, or a "T" shaped handle.

9. An apparatus according to claim 1 further comprising:
   a locker;
   a locker retainer, wherein said locker is fixedly connected to said first end of said guide housing;
   a threaded section on said input shaft; wherein said threaded section on said input shaft is operable to thread into a threaded inner bore in said locker; and a connection means for moveably connecting said locker to said locker retainer.

10. An apparatus according to claim 9, wherein said connection means comprises at least one of a group consisting of overlapping extrusions, pins and slots, or elastic connectors.

11. An apparatus according to claim 9, wherein said locker has an outer surface that is circular in cross-section.

12. An apparatus according to claim 1 further comprising:
a spring guide shaft with a first end and a second end, wherein said spring guide shaft is connected to said second drive gear at said second end and is operable to pass freely through said at least one return spring;
a plunger, wherein said plunger is attached to said spring guide shaft first end;
an inner bore in said input shaft, wherein said input shaft inner bore is large enough to accommodate said plunger;
a large inner bore in said first drive member, wherein said first drive member large inner bore is large enough to accommodate said plunger;
a small inner bore in said first drive member, wherein said first drive member small inner bore is large enough to allow said spring guide shaft to fit freely through; and
wherein said plunger is contained within a bore defined by said input shaft inner bore and said first drive member large inner bore, and said spring guide shaft passes through said at least one return spring and said first drive member.

13. An apparatus according to claim 1 wherein an outer surface of said guide housing is textured operable to allow said material extrusion to be gripped.

14. An apparatus according to claim 1 wherein an outer surface of said guide housing is either circular in cross-section, or polygonal in cross-section, wherein said polygonal cross-section is operable to have a wrench grip said outer surface of said guide housing.

15. An apparatus according to claim 1 further comprising:
a material extrusion extruding from said second drive member second end, wherein said material extrusion extrudes past an outer surface of said guide housing in an axial direction and wherein said material extrusion extrudes to or past the outer surface of said guide housing in a direction tangent to said axial direction.

16. An apparatus according to claim 15, wherein said material extrusion is textured operable to allow said material extrusion to be gripped, wherein said material extrusion texture comprises at least one of a group consisting of knurling, peening, or a textured coating.

17. An apparatus according to claim 15, wherein said material extrusion is circular in cross-section.

18. An apparatus for selective rotation between drive members comprising:
a first drive member with a first end and a second end;
a second drive member with a first end and a second end, wherein said first drive member first end is configured to engage said second drive member first end and wherein said second drive member second end is operable to connect with a drive socket mating connection;
an input shaft with a first end and a second end, wherein said input shaft first end is connected to said first drive member second end;
at least one return spring, wherein said return spring is located between said first drive member and said second drive member;
a guide housing with a first end, a second end, and an inner passageway, wherein said first drive member and said second drive member are located inside said inner passageway;
a retaining means for constraining axial movement of said first drive member and said second drive member within said inner passageway of said guide housing;
and a handle, wherein said handle is connected to said input shaft second end.

19. An apparatus according to claim 18, wherein said drive socket mating connection is one of a group consisting of a ¼" drive, ⅜" drive, ½" drive, or ¾" drive.

* * * * *